United States Patent
Ginis et al.

(10) Patent No.: US 8,081,704 B2
(45) Date of Patent: Dec. 20, 2011

(54) DYNAMIC DIGITAL COMMUNICATION SYSTEM CONTROL

(75) Inventors: Georgios Ginis, Stanford, CA (US); Wei Yu, Stanford, CA (US); Chaohuang Zeng, Palo Alto, CA (US); John M. Cioffi, Atherton, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/636,316

(22) Filed: Dec. 8, 2006

(65) Prior Publication Data

US 2007/0081582 A1    Apr. 12, 2007

Related U.S. Application Data

(63) Continuation of application No. 09/877,724, filed on Jun. 8, 2001, now Pat. No. 7,158,563.

(60) Provisional application No. 60/295,392, filed on Jun. 1, 2001.

(51) Int. Cl.
    *H04B 15/00* (2006.01)
(52) U.S. Cl. .................... 375/285; 375/346; 375/224
(58) Field of Classification Search .......... 375/224–225, 375/285, 346; 370/201; 455/295–296, 501, 455/63.1
    See application file for complete search history.

(56) References Cited

U.S. PATENT DOCUMENTS

| | | | |
|---|---|---|---|
| 4,191,926 A * | 3/1980 | Pontano et al. | 455/304 |
| 5,377,230 A * | 12/1994 | Golden | 375/296 |
| 5,471,647 A | 11/1995 | Gerlach et al. | |
| 5,843,139 A * | 12/1998 | Goedeke et al. | 607/32 |
| 5,887,034 A * | 3/1999 | Suzuki | 375/285 |
| 5,970,060 A * | 10/1999 | Baier et al. | 370/342 |
| 6,014,412 A * | 1/2000 | Wiese et al. | 375/346 |
| 6,292,559 B1 * | 9/2001 | Gaikwad et al. | 379/417 |
| 6,317,495 B1 * | 11/2001 | Gaikwad et al. | 379/417 |
| 6,404,830 B2 * | 6/2002 | Wiese et al. | 375/346 |
| 6,449,324 B2 * | 9/2002 | Wiese et al. | 375/350 |

(Continued)

FOREIGN PATENT DOCUMENTS

WO     WO 97/40608     10/1997

(Continued)

OTHER PUBLICATIONS

International Search Report, PCT/US02/17117, Mailed Aug. 28, 2002.*

(Continued)

*Primary Examiner* — Jean B Corrielus
(74) *Attorney, Agent, or Firm* — Crawford Maunu PLLC

(57) ABSTRACT

Methods, apparatus and systems for dynamically controlling a digital communication system, such as a DSL system, collect information about digital communication lines in the system and adaptively and/or dynamically determine line and signal characteristics of the digital communication lines, including interference effects. Based on the determined characteristics and the desired performance parameters, operation of the digital communication lines is adjusted to improve or otherwise control the performance of the system. The collection and processing of information may be performed by a party that is not a user in the system. This independent party also may control operational characteristics and parameters of the system. The invention can be used to eliminated or reduce signal interference such as crosstalk that can be induced on communication lines in systems such as DSL systems. Specific iterative power allocation and vectored transmission techniques and apparatus are disclosed.

3 Claims, 10 Drawing Sheets

U.S. PATENT DOCUMENTS

| | | | | |
|---|---|---|---|---|
| 6,456,673 | B1 * | 9/2002 | Wiese et al. | 375/346 |
| 6,470,047 | B1 * | 10/2002 | Kleinerman et al. | 375/232 |
| 6,839,429 | B1 * | 1/2005 | Gaikwad et al. | 379/417 |
| 6,873,653 | B1 * | 3/2005 | Rezvani et al. | 375/222 |
| 6,970,560 | B1 * | 11/2005 | Hench et al. | 379/417 |
| 6,975,603 | B1 * | 12/2005 | Dicker et al. | 370/329 |
| 6,978,015 | B1 * | 12/2005 | Erickson et al. | 379/417 |
| 6,985,548 | B1 * | 1/2006 | Jabbar et al. | 375/355 |
| 7,016,822 | B2 * | 3/2006 | Bosley et al. | 703/2 |
| 7,035,400 | B1 * | 4/2006 | Gaikwad et al. | 379/417 |
| 7,042,983 | B2 * | 5/2006 | Bauer et al. | 379/1.04 |
| 7,248,841 | B2 * | 7/2007 | Agee et al. | 455/101 |
| 2001/0026602 | A1 * | 10/2001 | Wiese et al. | 375/350 |
| 2001/0028692 | A1 * | 10/2001 | Wiese et al. | 375/346 |
| 2002/0027985 | A1 * | 3/2002 | Rashid-Farrokhi | 379/417 |
| 2002/0054610 | A1 * | 5/2002 | Reusens et al. | 370/480 |
| 2002/0138811 | A1 * | 9/2002 | Bosley et al. | 716/4 |
| 2002/0141347 | A1 * | 10/2002 | Harp et al. | 370/248 |
| 2002/0149484 | A1 * | 10/2002 | Carrender | 340/572.4 |
| 2002/0150187 | A1 * | 10/2002 | Chugg et al. | 375/348 |
| 2002/0172166 | A1 * | 11/2002 | Arslan et al. | 370/317 |
| 2003/0117995 | A1 * | 6/2003 | Koehn et al. | 370/350 |
| 2009/0028552 | A1 * | 1/2009 | Zhang et al. | 398/25 |

FOREIGN PATENT DOCUMENTS

WO    WO 00/51303    8/2000

OTHER PUBLICATIONS

J. Cioffi, et al, Vectored VDSL for Universal Band allocation (TD16) (Sep. 1999) Standard Univ., pp. 1-10.*

J. Cioffi et al, "G.vdsl: Vectored VDSL for universal Band allocation", (Nov. 1999) T.I.; ITU-Telecom. Standardization Sector, Nashville, TN, 8pp.*

J Cioffi et al., "Vectored VDSL (99-559)", Dec. 1999) Stanford U., Dept. of elec. Eng., pp. 2-10.*

Ginis, G. et al. "A multi-user precoding scheme achieving crosstalk cancellation with application to DSL systems." *IEEE* 2000. vol. 2, pp. 1627-1631.

* cited by examiner

DYNAMIC DIGITAL COMMUNICATION SYSTEM CONTROL

RELATED PATENT DOCUMENTS

This patent document is a continuation of U.S. patent application Ser. No. 09/877,724 filed on Jun. 8, 2001, and issued as U.S. Pat. No. 7,158,563 to which priority is claimed under 35 U.S.C. §120; which further claims benefit under 35 U.S.C. §119(e) of U.S. Provisional Application Ser. No. 60/295,392 filed on Jun. 1, 2001, all of which are full incorporated herein by reference.

BACKGROUND OF THE INVENTION

1. Field of the Invention

This invention relates generally to methods, systems and apparatus for managing digital communications systems. More specifically, the invention relates to dynamically controlling system parameters that affect performance in communication systems such as DSL systems.

2. Description of Related Art

The present invention refers to digital communication systems where the transmission medium typically is copper wiring. Most commonly, the copper wiring consists of twisted pairs (also referred to as "lines" or "loops") categorized according to several manufacturing specifications (for example, AWG-26, AWG-24, CAT-3, CAT-5, CAT-6). Typical communication systems making use of copper wiring include digital Subscriber Line (DSL) systems, such as ISDN, HDSL, ADSL and VDSL, and Local Area Networks (LAN), such as Ethernet. A transceiver (for example, a user modem) is situated at each end of the communications line that incorporates the copper wiring.

Existing phone lines typically are "bundled" in some way. "Bundling" several pairs (in a binder or otherwise) can improve service to a single user or permit service for multiple users. For example, 1000-BaseT Ethernet utilizes four twisted pairs to achieve a data rate of 250 Mbps per pair, or an aggregate rate of 1 Gbps (shown in FIG. 1). In FIG. 1, a data stream 110 is fed to a first transceiver 120, where the data stream 110 is decomposed into multiple component data streams 130 and, if desired modulated using a modulator 140. The modulated component data stream is transmitted over a twisted pair 150 to a demodulator 160 and re-composed in a second transceiver 170. Data may be sent in the opposite direction by reversing the roles of the various components previously described.

Another application is the use of the telephone loop plant for DSL service, one example of which is shown in FIG. 2. The twisted pairs 210 emanating from each Customer Premises Equipment (CPE) 220 are grouped into one or more binders 230, which converge at a terminus 240 such as a central office (CO), an optical network unit (ONU), or a remote terminal (RT). Of course, hybrid scenarios may also occur, such as the use of multiple pairs by a single DSL customer aiming to improve his overall data rate.

The bundling of twisted pairs arises either out of necessity (for example, the existing telephone loop infrastructure) or because of the benefits of improved performance (for example, 1000-BaseT Ethernet). In either case however, communications in these settings suffer from interference arising from electromagnetic coupling between neighboring pairs, referred to as "crosstalk" interference. This means that any signal received by a modem at the end of a twisted pair generally contains not only the transmitted signal of the specific pair (which itself is likely distorted to some extent), but also distorted signals transmitted on neighboring pairs. It is apparent, therefore, that the transmission characteristics of a specific pair (for example, the pair's transmitted power) can materially influence communication on a neighboring pair due to the induced crosstalk. Therefore, transmissions on neighboring pairs (especially those belonging to a bundle or sharing the same binder) are coupled in certain ways. The interfering signals are commonly treated as noise. However, crosstalk can be identified in some situations. (See U.S. Ser. No. 09/788,267, now U.S. Pat. No. 6,990,196 which is incorporated herein by reference.) If crosstalk coupling functions can be identified, it may be possible to remove the crosstalk interference.

"Unbundling" involves the incumbent local exchange carrier's (ILEC's) lease of a telephone line or some part of its bandwidth to a competitive local exchange carrier (CLEC). Current unbundling practice with DSL service usually allows the CLEC to place modulated signals directly on leased physical copper-pair phone lines, sometimes referred to as the lease of "dark copper." Such unbundled signals may provide services, and consequently use spectra, that differ among the various service providers. The difference in spectra can aggravate crosstalking incompatibilities caused by electromagnetic leakage between lines existing in close proximity. ILECs and CLECs try to ensure mutual spectral compatibility by standardizing the frequency bands and the power spectral densities that can be used by various DSL services. However, there are many DSL types and bandwidths, and service providers are often competitors, which complicates such spectrum management. Further, the cooperation and connection between spectrum regulators and DSL standards groups is still in early evolution, so that regulators may allow practices different than those presumed in spectrum management.

DSL spectrum management attempts to define the spectra of various DSL services in order to limit the crosstalk between DSLs that may be deployed in the same binder. Such crosstalk can be the limiting factor in determining the data rates and symmetries of offered DSL services at various loop reaches, so spectrum management finds some level of compromise between the various DSL service offerings that may be simultaneously deployed. Spectrum management studies tend to specify some typical and worst-case loop situations, and then proceed to define fixed spectra for each type of DSL to reduce the mutual degradation between services. Such a fixed spectrum assignment may not produce the desired level of compromise in situations different from those presumed in the studies.

These enacted rules place strict limits on transmission parameters, controlling performance degradation due to crosstalk by uniformly limiting all parties' transmissions in the system. Typically, the entire set of rules applies equally irrespective of the actual crosstalk environment (for example, whether neighboring pairs actually transmit signals or not), thereby providing protection for a worst-case scenario.

Currently, communication parameters at the physical layer (such as transmitted power, transmission bandwidth, transmitted power spectral density, energy allocation in time/frequency, bit allocation in time/frequency) are determined based on static information about a pair of modems and their twisted pair line. As seen in FIG. 3, an existing system 300 has modem pairs 310, 311 connected by twisted pair lines 312. Standardized requirements and constraints 314 for each link are provided to communication adaptation modules 315. In some cases measured line and signal characteristics of a line 312 can be fed back to the communication adaptation module 315 by a module 316 for a given line to assist in operation of the modem pairs 310, 311 corresponding to the line 312. As illustrated in FIG. 3, however, there is no communication or transfer of line and/or signal characteristics outside of each link and its respective modem pair. Moreover, no independent entity has knowledge of the operation of more than one modem pair and line or of the various pairs' interactions (for example, crosstalk between lines). Instead, the rules, requirements and constraints applied to lines and modems such as those shown in FIG. 3 are designed to accommodate the worst cases of crosstalk or other interference, irrespective of the actual conditions present in the system during operation.

One of the shortcomings of current multi-user communication systems is power control. In typical communication systems, which are interference-limited, each user's performance depends not only on its own power allocation, but also on the power allocation of all other users. Consequently, the system design generally involves important performance trade-offs among different users. The DSL environment can be considered a multi-user system, which would benefit from an advanced power allocation scheme that maximizes or allows selection from most or all of the achievable data rates for multiple DSL modems in the presence of mutual interference.

As mentioned above, DSL technology provides high speed data services via ordinary telephone copper pairs. The DSL environment is considered a multi-user environment because telephone lines from different users are bundled together on the way from the central office, and different lines in the bundle frequently create crosstalk into each other. Such crosstalk can be the dominant noise source in a loop. However, early DSL systems such as ADSL and HDSL are designed as single-user systems. Although single-user systems are considerably easier to design, an actual multi-user system design can realize much higher data rates than those of single-user system designs.

As the demand for higher data rates increases and communication systems move toward higher frequency bands, where the crosstalk problem is more pronounced, spectral compatibility and power control are central issues. This is especially true for VDSL, where frequencies up to 20 MHz can be used.

Power control in DSL systems differs from power control in wireless systems because, although the DSL environment varies from loop to loop, it does not vary over time. Since fading and mobility are not issues, the assumption of perfect channel knowledge is reasonable. This allows the implementation of sophisticated centralized power control schemes. On the other hand, unlike the wireless situation where flat fading can often be assumed, the DSL loops are severely frequency selective. Thus, any advanced power allocation scheme needs to consider not only the total amount of power allocated for each user, but also the allocation of power in each frequency. In particular, VDSL systems suffer from a near-far problem when two transmitters located at different distances from the central offices both attempt to communicate with the central office. When one transmitter is much closer to the central office than the other, the interference due to the closer transmitter often overwhelms the signal from the farther transmitter.

DSL modems use frequencies above the traditional voice band to carry high-speed data. To combat intersymbol interference in the severely frequency selective telephone channel, DSL transmission uses Discrete Multitone (DMT) modulation, which divides the frequency band into a large number of sub-channels and lets each sub-channel carry a separate data stream. The use of DMT modulation allows implementation of arbitrary power allocation in each frequency tone, allowing spectral shaping.

As shown in FIG. 4, a DSL bundle 410 can consist of a number of subscriber lines 412 bundled together which, due to their close proximity, generate crosstalk. Near-end crosstalk (NEXT) 414 refers to crosstalk created by transmitters located on the same side as the receiver. Far-end crosstalk (FEXT) 416 refers to crosstalk created by transmitters located on the opposite side. NEXT typically is much larger than FEXT. The examples of the present invention presented herein use frequency duplexed systems for illustrative purposes.

Current DSL systems are designed as single-user systems. In addition to a system total power constraint, each user also is subject to a static power spectrum density (PSD) constraint. The power spectrum density constraint limits the worst-case interference level from any modem; thus, each modem can be designed to withstand the worst-case noise. Such a design is conservative in the sense that realistic deployment scenarios often have interference levels much lower than the worst-case noise, and current systems are not designed to take advantage of this fact. In addition, the same power spectrum density constraint is applied to all modems uniformly regardless of their geographic location.

The absence of different power allocations for different users in different locations is problematic because of the near-far problem mentioned before. FIG. 5 illustrates a configuration in which two VDSL loops 510 in the same binder emanate from the central office 512 to a far customer premises 514 and a near customer premises 516. When both transmitters at the CPE-side transmit at the same power spectral density, the FEXT 526 caused by the short line can overwhelm the data signal in the long line due to the difference in line attenuation. The upstream performance of the long line is therefore severely affected by the upstream transmission of the short line. To remedy this spectral compatibility problem between short and long lines, the short lines must reduce their upstream power spectral densities so that they do not cause unfair interference into the long lines. This reduction of upstream transmit power spectral density is known as upstream power back-off. Note that the downstream direction does not suffer from a similar problem because, although all transmitters at the CO-side also transmit at the same power spectral density, the FEXT they cause to each other is identical at any fixed distance from CO. This downstream FEXT level is typically much smaller than the data signals, so it does not pose a serious problem to downstream transmission.

Several upstream power back-off methods have been proposed in VDSL. All current power back-off methods attempt to reduce the interference emission caused by shorter loops by forcing the shorter loop to emulate the behavior of a longer loop. For example, in the constant power back-off method, a constant factor is applied across the frequency in upstream transmission bands, so that at a particular reference frequency the received PSD level from shorter loops is the same as the received PSD level from a longer reference loop.

A generalization of this method is called the reference length method where variable levels of back-off are implemented across the frequency so that the received PSD for a shorter loop is the same as some longer reference loop at all frequencies. However, imposing the same PSD limit for shorter loops across the entire frequency band may be too restrictive since high frequency bands usually have too much attenuation to be useful in long loops. Therefore, short loops should be able to transmit at high frequency bands without worrying about their interference.

This observation leads to the multiple reference length method, which sets a different reference length at each upstream frequency band. All of the methods mentioned above equalize the PSD level of a shorter loop to the PSD level of some longer reference loop. While these methods may be easy to implement in some cases, better performance can be obtained if the interference levels themselves are equalized instead. Examples of such approaches are the equalized-FEXT method, which forces the FEXT emission by shorter loops to be equal to the FEXT from a longer reference loop, and the reference noise method which forces the FEXT emission to equal to a more general reference noise. Although there presently is no consensus on a single method, it is clear that a flexible method such as reference noise that allows spectrum shaping is more likely to provide better performance.

Previously proposed power back-off methods require the power or noise spectrum of the short loops to comply with a reference loop or a reference noise. These approaches are simple to implement because each loop only needs to adjust its power spectrum according to a reference and do not require any knowledge of the network configuration. If, however, loop and coupling characteristics in the network are known to either the loops themselves, or a centralized third party, adaptive adjustment power spectrum levels can be implemented, allowing better system performance.

However, the optimization problem involved is complex as a result of the large number of variables and, due to the non-convex nature of the problem, many local minima exist. Early attempts at solving this problem often resorted to added constraints such as all transmitter power spectrum densities being the same, or all PSDs being in some sense symmetrical. The first attempt at finding the true global optimum is based on quantum annealing to minimize the total energy subject to rate constraints on each user.

As will be appreciated by those skilled in the art, the earlier methods described above had various shortcomings. Some of these methods were simple to implement, but forfeited available performance for the sake of such simplicity. The methods that attempted to realize higher performance levels, on the other hand, were too complex to be practical. A relatively simple method and system that can achieve substantial improvement in system performance would represent an important advancement in the art.

As noted above, DSL systems are rapidly gaining popularity as a broadband access technology capable of reliably delivering high data rates over telephone subscriber lines. The successful deployment of Asymmetric DSL (ADSL) systems has helped reveal the potential of this technology. Current efforts focus on VDSL, which allows the use of bandwidth up to 20 MHz. ADSL can reach downstream rates up to 6 Mbps, while VDSL aims to deliver asymmetric service with downstream rates up to 52 Mbps, and symmetric service with rates up to 13 Mbps. However, DSL communication is still far from reaching its full potential, and the gradual "shortening" of loops presents an opportunity to develop advanced methods that can achieve improved rates and performance.

In advanced DSL service the location of the line termination (LT or "central-office side"), as well as network termination (NT or "customer premises side"), can vary. That is, not all LT modems are in the same physical location. Often the location may be an ONU or cabinet, where placement and attachment of CLEC equipment may be technically difficult if not physically impossible. The difficulty arises because CLEC fiber access to the ONU may be restricted and/or the ONU may not be large enough to accommodate a shelf/rack for each new CLEC. Placement of such CLEC equipment for dark copper is often called "collocation" when it is in the central office. While space and facilitation of such central office collocation for unbundling of the dark copper might be mandated by law in some cases, an ILEC may only provide what is essentially packet unbundling at the LT terminal (that is, service bandwidth leased at a layer 2 or 3 protocol level, not at the physical layer). This represents a change in the architecture presumed in many spectrum studies.

Control of all the physical layer signals by a single service provider allows coordination of the transmitted signals in ways that can be beneficial to performance of DSL service. Packet unbundling, which makes available the digital bandwidth on the twisted pairs, rather than the direct physical layer lease of the line itself, is seen to be a likely step in the evolution of DSL service.

A developing DSL system topology is shown in FIG. 6. Some twisted pairs 616 emanate from the CO 610 and reach out to the customer premises 614. The installation of an ONU 612 (at a point between the CO 610 and one or more CPEs 614) shortens loop lengths 618 so that the reach and performance of DSL service are improved. Typically, the ONU 612 is connected to the CO 610 through a fiber link 622. Pairs 616 and 618 can occupy the same binder 620.

Crosstalk coupling is strongest among the twisted-pairs in a binder group. Therefore, eliminating or mitigating self-FEXT within a binder group has the biggest performance benefit. "Unbundled" lines of different service providers may share a binder group which can result in the absence of collocation of the CO transceiver equipment. However, there are indications that ONU deployment will lead to an architecture in which some type of vectored transmission will be necessary since different service providers may have to "share" a fiber link to an ONU (for example, link 622 of FIG. 6) from which individual user lines will emanate and to which they will converge. More specifically, the current architecture of "line unbundling" becomes impractical with the installation of ONUs, since line unbundling implies that each service provider uses its own individual fiber to provide a proprietary connection to the ONU, and that the ONU must be large enough to accommodate a shelf or rack for each service provider. Often, this is not practical or possible. These difficulties may lead to the evolution of "packet unbundling" where service bandwidth is leased at the transport layer, instead of the physical layer. In that case, vectored transmission becomes more appealing because it can offer substantial performance improvement and enhanced control.

The crosstalk problem has been addressed before with some shortcomings. For example, in some systems, MIMO Minimum-Mean-Square-Error (MMSE) linear equalizers were derived. Another prior method employs the singular value decomposition to achieve crosstalk cancellation assuming co-location of both transmitters and receivers. Other earlier methods include "wider than Nyquist" transmitters which were shown to provide performance advantages compared to "Nyquist-limited" ones, and crosstalk cyclostationarity (induced by transmitter synchronization) combined with oversampling which were shown to result in higher SNR values.

None of the earlier methods or systems provided a relatively simple and effective reduction in crosstalk interference in wireline communication systems. However, vectored transmission (as defined in this invention) can achieve a high degree of crosstalk reduction without unreasonable complexity. Moreover, the use of vectored transmission can accommodate the approaching architectural changes coming to DSL service as well as providing an opportunity for dynamic system management which can overcome the shortcomings of prior systems and methods.

BRIEF SUMMARY OF THE INVENTION

The present invention relates to methods, apparatus and systems for dynamically controlling a digital communication system, such as a DSL system. Some embodiments of the present invention make use of some level of knowledge regarding neighboring communication lines and/or the transmission environment (for example, determining line and signal characteristics in one or more of a group of communication lines in the system) in order to improve performance on some or all of the lines. Generally, the present invention includes methods which determine physical layer communication parameters, based on information obtained about the transmission environment, and which then evaluate optimization criteria related to corresponding links. Communication parameter adaptation may either occur once (for example, during modem initialization), periodically or even continuously. The purpose of performing this joint adaptation is to utilize information about the channel characteristics and about link requirements and constraints, which can yield improvements in the provisioning of services. Some embodiments of the present invention include methods where information is gathered for all links, but the joint adaptation applies only to a subset of those links (even a single link).

Information regarding the line characteristics and signaling characteristics of all links can be shared or provided to an independent entity in some embodiments. Line characteristics can include features such as loop topology, transfer functions, and crosstalk coupling functions. For example, knowledge of crosstalk coupling can allow performance improvements, since the amount of degradation of signals due to transmission on one or more neighboring links can be accurately estimated. As a result, a change in system operation (for example, an increase in transmitted power) might be determined to improve performance without degrading neighboring links.

Signaling characteristics can include transmitted power spectral density, bandwidth utilized, modulation type, and bit allocation. Use of this information in connection with the present invention may allow the distribution in frequency of the available power, so that the impact among neighboring links is minimized.

In addition to the shared information regarding line and signaling characteristics, joint signal processing methods can be employed, utilizing knowledge of the transmitted bit streams. This coordination level is directly related to the concept of "vectored" transmission, where crosstalk essentially is removed. Again, this allows a different class of adaptation methods, where the power and frequency resources of all links can be optimally allocated in order to achieve the desired requirements.

More specifically, in one embodiment of the present invention, a digital communication system is controlled by collecting information about digital communication lines in the system and adaptively and/or dynamically determining line and signal characteristics of the digital communication lines. Based on the determined characteristics and the desired performance parameters, operation of the plurality of digital communication lines is adjusted to improve or otherwise control the performance of the digital communication system. The collection and processing of information may be performed by a party that is not a user in the system. This independent party also may control operational characteristics and parameters of the system. In some embodiments, the present invention is used to eliminate or reduce signal interference such as crosstalk that can be induced on groups of communication lines in systems such as DSL systems.

In another embodiment, a digital communication system has a number of communication lines, each of the lines being used by a user, where the total power a user can use in the system is limited by a power constraint. A method of controlling system operation includes assigning the total power constraint for each user an initial value and then determining a competitively optimal data rate for each user. The competitively optimal data rate is ascertained by determining a power allocation within the user's total power constraint as a result of iteratively allowing each user to optimize its power allocation. The competitively optimal data rate for a user is based on the power allocation arrived at by that user and is evaluated by comparing the competitively optimal data rate with a target rate for the user. Depending on the comparison of the competitively optimal data rate and the user's target rate, changes to the user's power constraint may be made. The power constraint is increased for a user if the competitively optimal data rate of the user is less than the target rate for the user; the power constraint is decreased if the competitively optimal data rate of the user exceeds the target rate for the user by at least a prescribed variance; and the power constraint remains the same if the competitively optimal data rate of the user is equal to the target rate for the user or if the competitively optimal data rate of the user exceeds the target rate for the user by less than the prescribed variance. This embodiment can be used in a line unbundling environment.

In another embodiment of the present invention, a digital communication system has a plurality of communication lines on which signals are transmitted and received, the signals being affected by interference during transmission. Each of the communication lines is used by a user and has at least one transmitter and at least one receiver. A method of controlling the system includes collecting information about line, signal and interference characteristics of the communication lines and creating a mode of those line, signal and interference characteristics of the communication lines. Transmission of signals between transmitters and receivers are synchronized to permit signal processing using the model to remove interference from signals.

This embodiment can be used in a packet unbundling environment.

In another embodiment of the present invention, a method is implemented where communication signals are affected by interference during transmission on communication lines and each of the communication lines has at least one transmitter and at least one receiver. A model is created of the interference characteristics due to the signals carried on the communication lines.

Further details and advantages of the invention are provided in the following Detailed Description and the associated Figures.

BRIEF DESCRIPTIONS OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
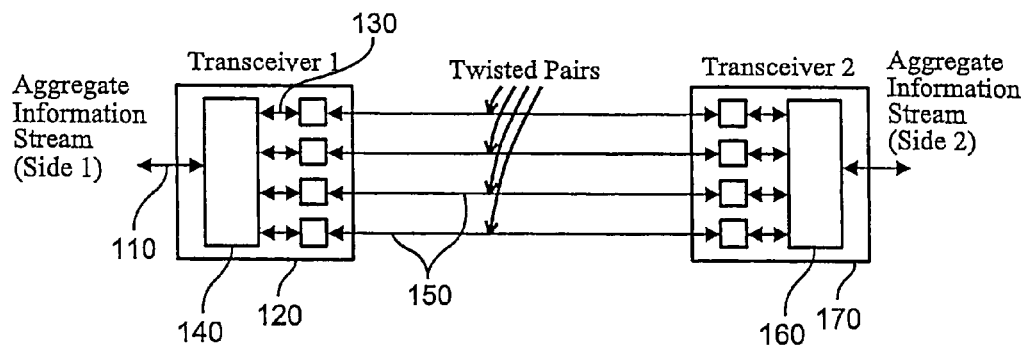
FIG. 1 is a schematic diagram of a set of twisted pair telephone lines used for transmission of an aggregate information stream.
Figure 2:
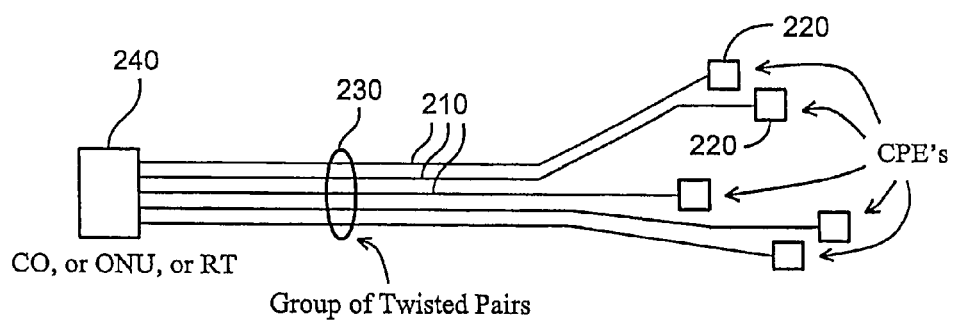
FIG. 2 is a schematic diagram of a DSL system utilizing an existing telephone loop plant.
Figure 3:
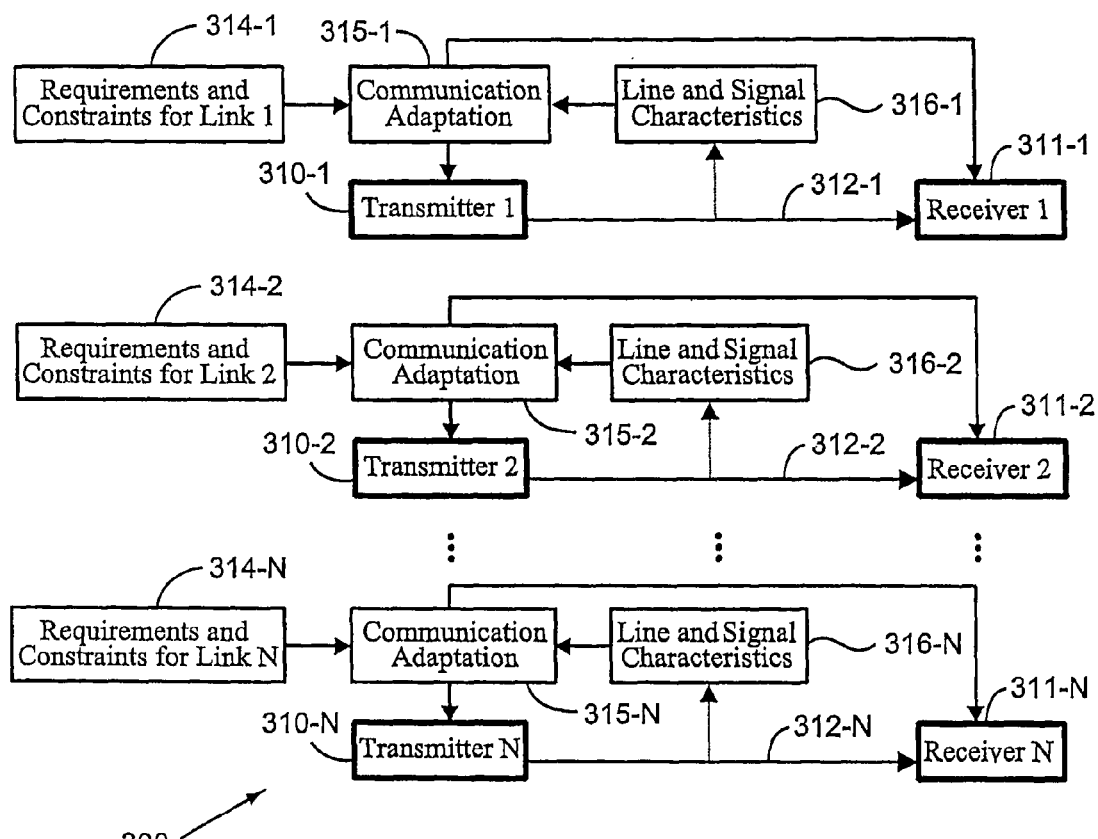
FIG. 3 is a schematic view of a communication system using link requirements and constraints and line and signal characteristic information on a per line basis.

The following detailed description of the invention will be with reference to one or more embodiments of the invention, but is not limited to such embodiments. The detailed description is intended only to be illustrative. Those skilled in the art will readily appreciate that the detailed description given herein with respect to the Figures is provided for explanatory purposes as the invention extends beyond these limited embodiments. For example, the present invention is described in some instances in connection with a DSL system. However, the present invention can be used with other systems that would benefit from the improved performance afforded by the present invention. Consequently, the present invention is not limited solely to DSL systems. Moreover, the present invention is described herein primarily in connection with the reduction of crosstalk interference. Again, however, the present invention may be used to reduce or eliminate other undesirable signal interference or to otherwise improve the performance of the system in which the present invention is used.

Performance of the system may be measured by maximizing data rates to users. However, in some systems, operators may wish to be able to offer a variety of services to users. For example, if an operator knows all of the available rates for a bundle, that operator may be able to offer certain users higher data rates as a "premium" service or for specialized needs (such as a hospital or emergency care provider). As will be appreciated from the foregoing, terms such as "optimal" and "optimization" therefore may be subjectively defined and may not necessarily refer to the fastest data rate(s), per se.

"Static spectrum management" uses fixed, inflexible constraints, limits and requirements in connection with various digital communications systems. By contrast, a system with adaptive determination of spectra is referred to herein as "dynamic spectrum management." Necessarily, static spectrum management is a special case of dynamic spectrum management, so static spectrum management can never outperform dynamic spectrum management. In fact, substantial improvement can be provided by dynamic spectrum management. The present invention illustrates that the level of improvement varies with loop characteristics, crosstalk coupling functions, data rates and symmetries offered, but can be significant. The level of relative improvement increases as loop lengths get shorter and data rates get more symmetric, as is likely to be the case with the present evolution of DSL. Importantly, dynamic spectrum management according to the present invention allows a greater mix of high-performance asymmetric and symmetric services in the same binder.

The present invention will be described in general with respect to a digital communications system. Within the context of dynamic spectrum management, however, there are two situations relating to the unbundling of communications services that will be addressed by example in particular—line unbundling and packet unbundling for DSL service. "Line unbundling" occurs when different service providers place electric physical-layer signals on copper wire lines within a telephone cable, which is the current practice when lines terminate in a central office. A specific illustrative example of the present invention (spectrum balancing) will be presented below and is applicable in a line unbundling environment. "Packet unbundling" occurs when service providers instead lease bit streams from a single common carrier who manages all signals on a telephone cable, meaning that different service providers are utilizing the same telephone cable. This can occur, for example, when fiber is used to connect a central office to an ONU, from which different service providers' twisted pairs in turn emanate. An illustrative example of the present invention (vectored transmission) will be explained below and is applicable in a packet unbundling environment.

General

In some embodiments, the present invention uses methods which make use of some level of knowledge regarding the neighboring systems and the transmission environment, in order to improve performance on all pairs. As a simple example, when crosstalk coupling between lines is weak, various transmission restrictions can be relaxed without substantial impact. Going further, systems on neighboring pairs may shape their power spectral densities so that the mutually induced crosstalk is minimized and their performance targets are met.

The present invention further is defined to include methods and apparatus which determine and control physical layer communication parameters, based on information obtained about the whole transmission environment (the set of all neighboring twisted pairs) and where optimization criteria may relate to all the corresponding links. The communication parameters also may refer to the time periods over which transmission on a pair is allowed, implying schemes similar to time division multiple access. The communication parameter adaptation can occur once (for example, during modem initialization), periodically, or even continuously.

The joint adaptation utilizes information about channel characteristics and about link requirements and constraints, which results in the provisioning of improved services. In some embodiments, information is gathered for all links, but the joint adaptation applies only to a single subset of those links. In another embodiment of the present invention, information is gathered about all of the links, but the joint adaptation is applied independently to subsets of those links. In still other embodiments, information may be gathered about only a subset of the links, with the joint adaptation being applied to all or a subset of the links.

Figure 7:
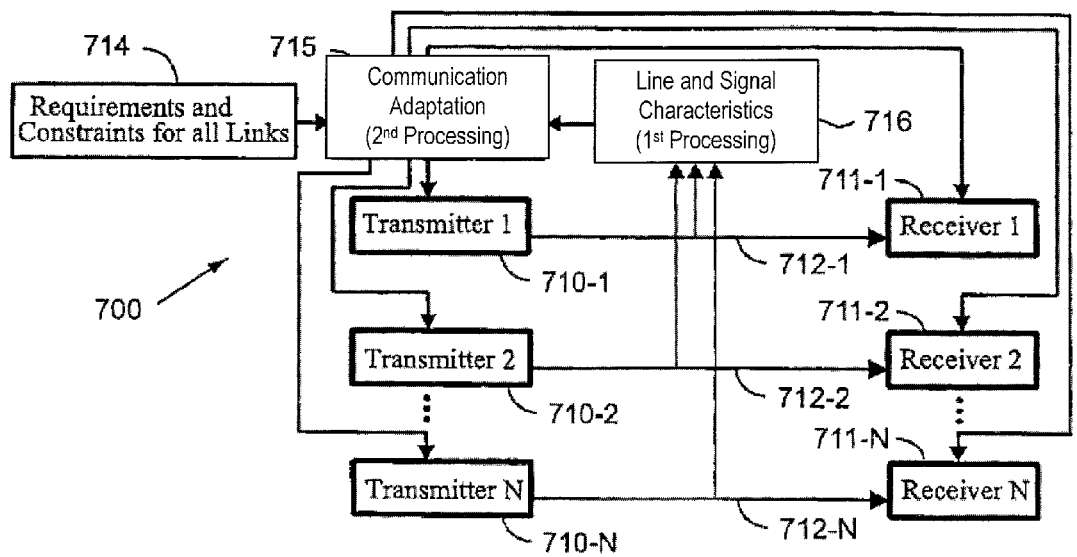
FIG. 7 is a schematic representation of one embodiment of the present invention in which information about line and signal characteristics from a number of DSL lines is shared and used in a joint communication adaptation configuration.

One embodiment of the present invention is shown in FIG. 7. As with earlier systems, a digital communications system 700 uses pairs of modems 710, 711 which are connected by twisted pair lines 712. Universal requirements and constraints (for example, total system power and power constraints on each line) can be applied to all links in the system by a module 714. Again, line and signal characteristics for each line 712 can be acquired and provided to the communication adaptation module 715. The operator of the module 715 may be a single service provider, a group of service providers or an independent entity 716 that collects and evaluates system data and provides instructions to users or, in some cases, possibly controls system parameters to achieve desirable operational characteristics. In FIG. 7 the line and signal characteristics can be acquired for all (or a subset of) lines and can be coordinated or otherwise considered in a joint manner.

In some embodiments of the present invention, information is shared regarding the line characteristics of all links. One example can be found in U.S. Ser. No. 09/788,267, now U.S. Pat. No. 6,990,196 which is incorporated herein by reference. Line characteristics can include, but are not limited to, loop topology, transfer functions and crosstalk coupling functions. For example, knowledge of crosstalk coupling can allow performance improvements, since the amount of degradation of a link due to transmission on a neighboring link can be accurately estimated, and thus it may be realized that an increase in the transmitted power will improve the performance of the link without degrading the neighboring links.

In still other embodiments of the present invention, information also (or instead) is shared regarding the signaling characteristics. Signaling characteristics can include, but are not limited to, transmitted power spectral density, bandwidth utilization and allocation, modulation type and bit allocation. This may allow the application of a new class of methods and apparatus, such as those involving the distribution in frequency of available power, so that the impact among neighboring links is minimized.

In addition to sharing information regarding line and/or signaling characteristics, joint signal processing methods can be employed which will utilize knowledge of the transmitted bit streams. This coordination level is directly related to the concept of "vectored" transmission, where crosstalk is essentially removed. Again, this allows a different class of adaptation methods, where the power and frequency resources of all links can be optimally allocated in order to achieve the desired requirements.

Two specific implementations of the present invention are now presented. The first uses an adaptive multi-user power control methodology, presented as an example as applied to a VDSL system. Such a system is useful in a line unbundling environment where different service providers may have access to different lines in a binder and/or different services that potentially negatively affect one another are provided on the lines in the binder.

Adaptive Power Control Method

The digital subscriber line (DSL) environment can be viewed as a multi-user system. One embodiment of the present invention is intended to optimize power allocation to identify the maximum achievable data rates for multiple DSL modems in the presence of mutual interference. The following discussion will use VDSL as an example, and show that a multi-user system design with an advanced power allocation scheme can provide a system with substantial performance improvement as compared to a single-user design that does not take the multi-user aspect into account. This advanced power allocation method can be implemented either in a centralized fashion or a distributed fashion. The centralized approach assumes the existence of an entity which acquires knowledge of channel and crosstalk coupling functions, determines the desired signaling characteristics and parameters for each user, and finally instructs each user to employ these transmission characteristics and parameters.

Another embodiment does not require knowledge of the crosstalk coupling functions. In such an embodiment, the modems of each user enter a phase during which each user individually adjusts its own signaling characteristics with the aim of attaining its own desired performance level, while minimizing the crosstalk it induces on the other users. In this embodiment, a centralized entity may still exist, but its role may be restricted to setting the target performance levels of each user.

Figure 8:
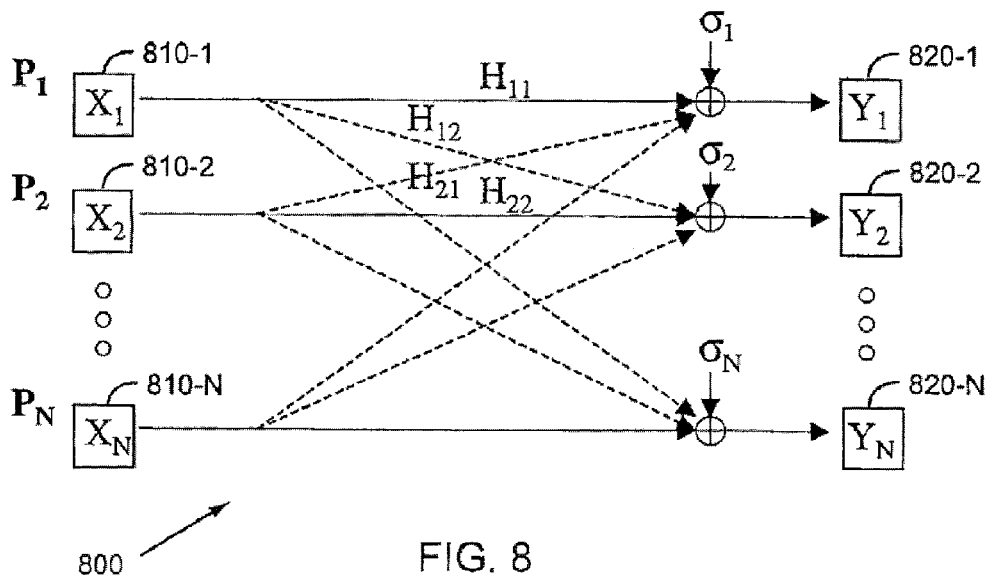
FIG. 8 is an interference channel model showing crosstalk interference among DSL lines.

The following discussion will evaluate transmission techniques where no multi-user detection takes place, and focus solely on advanced power allocation for each user in the network. An interference channel model 800 is shown in FIG. 8. There are N transmitters 810-1 through 810-N and N receivers 820-1 through 820-N in the network 800. The channel from user i to user j is modeled as an ISI channel, whose transfer function in frequency domain is denoted as $H_{ij}(f)$, where $$0 \le f \le F_s, F_s = \frac{1}{2T_s},$$

and $T_s$ is the sampling rate. In addition to the interference noise, each receiver also sees a background noise whose power spectrum density is denoted as $\sigma_i(f)$. The power allocation for each transmitter is denoted as $P_i(f)$, which must satisfy a power constraint:

$$\int_0^{F_s} P_i(f) df \le P_i \qquad \text{Equation (1)}$$

The achievable data rate for each user while treating all interference as noise is:

$$R_i = \int_0^{F_s} \log_2 \left( 1 + \frac{P_i(f)|H_{ii}(f)|^2}{\Gamma \left( \sigma_i(f) + \sum_{j \ne i} P_j(f)|H_{ji}(f)|^2 \right)} \right) df \qquad \text{Eq. (2)}$$

where $\Gamma$ denotes the SNR-gap which depends on the probability of error, the modulation scheme and the coding applied. A coding and modulation scheme that approaches the information theoretical capacity has $\Gamma=0$ dB.

The objective of the system design is to maximize the set of rates $\{R_1, \ldots, R_N\}$ subject to the power constraints of Equation (1). It will be apparent to those of skill in the art that, for each transmitter, increasing its power at any frequency band will increase its own data rate. However, such an increase also causes more interference to other users and is therefore detrimental to other users' transmissions. Thus, an optimization or other advanced design must consider the trade-off among the data rates of all users.

Realistic DSL deployment often requires multiple service rates be supported for all users, and the required level of service of each user could be arbitrary. Therefore, a single figure of merit frequently is inadequate to represent system performance. Also, as noted above, one may wish to know all achievable data rate combinations for the users in a system.

For example, if the objective is to maximize the sum rate, then there is no guarantee of a minimal data rate to any one user.

A convenient way to fully characterize the trade-off among the users and the achievable data rates available to them is through the notion of a rate region, which is defined as:

$$R=\{(R_1, \ldots, R_N): \exists (P_1(f), \ldots, P_N(f)) \text{ satisfying Eqs. (1) and (2)}\}. \quad \text{Eq. (3)}$$

The rate region characterizes all possible data rate combinations among all users. Although in theory, the rate region can be found by an exhaustive search through all possible power allocations, or by a series of optimizations involving weighted sums of data rates, computational complexities of these approaches typically are prohibitively high. This is because the rate formula is a non-convex function of power allocations. Consequently, the usual numerical algorithms are able to find only local maxima and not the global maximum. The present invention avoids these complexities by defining a different concept of competitive optimality. Although the methodology of this embodiment of the present invention does not achieve all points in the rate region defined above, it nevertheless performs much better than the current DSL systems.

Instead of finding the global maximum, the present invention utilizes competitive optimality, which has the advantage of providing the locally optimal solution toward which all users have an incentive to move. These competitively optimal points are easy to characterize, and they lead to a power control method that offers a number of advantages compared to the previous methods. First, unlike previous methods that set a PSD level for each VDSL transmitter based solely on its interference emission level, the new power allocation method of the present invention strikes a balance between maximizing each user's own data rate and minimizing its interference emission. In particular, the frequency selective nature of the channel is dealt with explicitly. Second, by taking into account all loop transfer functions and cross-couplings (directly in the embodiment using a centralized control entity, tacitly in the embodiment using a distributed method), the method of the present invention offers the loops an opportunity to negotiate the best use of power and frequency with each other. Third, the usual PSD constraint, which is in place for the purpose of controlling interference, is no longer needed. Only total power constraints apply. Fourth, unlike previous methods, which fix a data rate for each loop regardless of actual service requirement, the new method naturally supports multiple service requirements in different loops. Fifth, the proposed method does not involve arbitrary decisions on the reference noise or reference length. Finally, much better performance can be achieved both in terms of maximum data rates and selectivity of services and/or rates within a system.

Competitive Optimality

The traditional information-theoretic view of an interference channel allows the different transmitters, while sending independent data streams, to be cooperative in their respective coding strategies, so that interference cancellation can take place in the receivers. If such cooperation cannot be assumed, the interference channel can be better modeled as a non-cooperative game. Under this viewpoint, each user competes for data rates with the sole objective of maximizing its performance, regardless of all other users. This scenario is particularly realistic in the current unbundled environment where different loops in the same binder could belong to different service providers, and they indeed compete in the local access market. Now, because each modem has a fixed power budget, each user should adjust its power allocation to maximize its own data rate, while regarding all other interference as noise.

If such power adjustment is done continuously for all users at the same time, they will eventually reach an equilibrium. Such an equilibrium will be a desired system operating point since, at equilibrium, each user will have reached its own local maximum, and nobody has an incentive to move away from that power allocation. From a game theory perspective, this equilibrium point is called the Nash equilibrium.

A Nash equilibrium is defined as a strategy profile in which each player's strategy is an optimal response to each other player's strategy. The following discussion will characterize the Nash equilibrium in the Gaussian interference channel game, and determine its existence and uniqueness in realistic channels.

A two-user interference channel provides the following simplified model:

$$y_1 = x_1 + A_2 x_2 + n_1 \quad \text{Eq. (4)}$$

$$y_2 = x_2 + A_1 x_1 + n_2 \quad \text{Eq. (5)}$$

where the channel transfer functions are normalized to unity. The square magnitude of the interference transfer functions $A_1$ and $A_2$ are denoted as $\alpha_1(f)$ and $\alpha_2(f)$, respectively. Let $N_1(f)$ and $N_2(f)$ denote noise power spectrum densities. The two senders are considered as two players in a game. The structure of the game (that is, the interference coupling functions and noise power) are assumed to be common knowledge to both players. A strategy for each player is its transmit power spectrum, $P_1(f)$ and $P_2(f)$, subject to the power constraints $\int_0^{F_s} P_1(f) df \leq P_1$ and $\int_0^{F_s} P_2(f) df \leq P_2$, respectively, considering only deterministic, or pure strategy here. The payoff for each user is its respective data rate. Under the simplifying assumption that no interference subtraction is performed regardless of interference strength, the data rates are:

$$R_1 = \int_0^{F_s} \log\left(1 + \frac{P_1(f)}{N_1(f) + \alpha_2(f) P_1(f)}\right) df \quad \text{Eq. (6)}$$

$$R_2 = \int_0^{F_s} \log\left(1 + \frac{P_2(f)}{N_2(f) + \alpha_1(f) P_2(f)}\right) df \quad \text{Eq. (7)}$$

If we compare the above expression with equation (2), we can identify:

$$N_1(f) = \frac{\Gamma \sigma_1(f)}{|H_{11}(f)|^2} \quad \text{Eq. (8)}$$

and $$\alpha_2(f) = \frac{|H_{21}(f)|^2}{\Gamma |H_{11}(f)|^2} \quad \text{Eq. (9)}$$

and $$N_2(f) = \frac{\Gamma \sigma_2(f)}{|H_{22}(f)|^2} \quad \text{Eq. (10)}$$

and $$\alpha_1(f) = \frac{|H_{12}(f)|^2}{\Gamma |H_{22}(f)|^2} \quad \text{Eq. (11)}$$

Thus, the simplified model incurs no loss of generality.

The data rate game discussed here is not a zero-sum game. That is, one player's loss is not equal to the other player's gain. Since at a Nash equilibrium, each user's strategy is the optimal response to the other player's strategy, and for each user, the optimal power allocation given other player's power level is the water-filling of the power against the combined noise and interference, a Nash equilibrium is reached if water-filling is simultaneously achieved for all users.

A complete characterization of the simultaneous water-filling point in the interference channel may be difficult to do, however there are several sufficient conditions for the existence and uniqueness of the Nash equilibrium in the two-user case. For all $\alpha_1(f)\alpha_2(f)<1$, $\forall f$, then at least one pure strategy Nash equilibrium in the Gaussian interference game exists. Further, if:

$$\lambda_0 = sup\{\alpha_1(f)\}sup\{\alpha_2(f)\} \quad \text{Eq. (12)}$$

$$\lambda_1 = sup\{\alpha_1(f)\alpha_2(f)\} \quad \text{Eq. (13)}$$

$$\lambda_2 = sup\{\alpha_1(f)\}\frac{1}{F_s}\int_0^{F_s}\alpha_2(f)df \quad \text{Eq. (14)}$$

$$\lambda_3 = sup\{\alpha_2(f)\}\frac{1}{F_s}\int_0^{F_s}\alpha_1(f)df \quad \text{Eq. (15)}$$

and either $$\lambda_0 < 1, \text{ or} \quad \text{Eq. (16)}$$

$$\lambda_1 + \lambda_2 < \frac{1}{2}, \text{ or} \quad \text{Eq. (17)}$$

$$\lambda_1 + \lambda_3 < \frac{1}{2} \quad \text{Eq. (18)}$$

then the Nash equilibrium is unique and is stable.

The convergence of the iterative water-filling process shows that the Nash equilibrium is unique. This is because the starting point is arbitrary, so it could be another Nash equilibrium if it were not unique. But each Nash equilibrium is its own fixed point. So, this cannot happen. The stability of the Nash equilibrium also follows from the convergence of the iterative procedure.

Moreover, if the condition for existence and uniqueness of the Nash equilibrium is satisfied, then an iterative water-filling algorithm, where in every step each modem updates its power spectrum density regarding all interference as noise, converges and it converges to the unique Nash equilibrium from any starting point.

Adaptive Power Control

Because of the frequency-selective nature of the DSL channel and the DSL crosstalk coupling, power control algorithms in the DSL environment not only need to allocate power among different users, they also need to allocate power in the frequency domain. This requirement brings in many extra variables and makes the design of advanced power control for DSL difficult. However, by concentrating on the competitive optimal power allocations, and assuming that the existence and uniqueness conditions under a total power constraint for Nash equilibrium are satisfied, total power alone is sufficient to represent all competitive power allocations. Consequently, power control can be based solely on total power despite the frequency selectivity. This simplifies the process tremendously. Although the competitive optimal solutions are in general not globally optimal, impressive improvement can still be realized when compared to existing power back-off algorithms.

The goal is to achieve certain target rates for each user. The adaptive process runs in two stages. The inner stage uses given power constraints for each user as the input and derives the competitive optimal power allocation and data rates as output. This is accomplished by the iterative water-filling procedure. With a fixed total power constraint for each user, the first user updates its power allocation as the water-filling spectrum of its channel regarding all other users' crosstalk as noise. Water-filling is then applied successively to the second user, the third user, and so forth, then again to the first user, second user, etc., until each user's power allocation converges. Alternative (or even random) orderings also will work, provided that all users are "served" in due course.

The outer stage finds the optimal total power constraint for each user. The outer procedure adjusts each user's power constraint based on the outcome of the inner iterative water-filling. If a user's data rate is below the user's target rate, then the user's power constraint will be increased, unless it is already at the modem power limit, in which case its power stays the same. If a user's data rate is above its target rate by a prescribed amount, its power will be decreased. If the data rate is only slightly above the target rate (less than the prescribed amount), its power will be unchanged. The outer procedure converges when the set of target rates is achieved.

The method described above applies to the distributed version, where each user acts independently, apart from the fact that its target data rate has been "imposed" on the user by an outside agent or entity. It is easy to derive a centralized version, where a central entity performs the inner and outer iteration steps, and then determines power allocations, which it then instructs the users to adopt. The centralized version implies that the entity has acquired knowledge of some or all of the line and/or signal characteristics.

In a K-user system, using P as the modem power limit and $T_i$ as the target rate of user i, the preferred process can be summarized as follows:

Initialize $P_i = P$, i=1, ..., K.
repeat
    repeat
        for i=1 to K $$N(f) = \sum_{j=1, j\neq i}^{K} |H_{ji}(f)|^2 P_j(f) + \sigma_i(f);$$

$P_i(f)$=water-filling spectrum with channel $|H_{ii}(f)|^2$, noise $N(f)$, and power constraint $P_i$
        $R_i$=data rate on channel $|H_{ii}(f)|^2$ with the power allocation $P_i(f)$, and noise $N(f)$
    end
    until the desired accuracy is reached.
    for i=1 to K
        If $R_i > T_i + \epsilon$, set $P_i = P_i - \delta$.
        If $R_i < T_i$, set $P_i = P_i + \delta$.
        If $P_i > P$, set $P_i = P$.
    end
until $R_i > T_i$ for all i.

This process works well with the parameters $\delta = 3$ dB and $\epsilon$ equal to 10% of the target rate. The outer iteration converges only if the set of target rates is achievable. Unfortunately, which set of target rates is achievable cannot be known a priori. However, a centralized agent with full knowledge of all channel and interference transfer functions can decide, by running through all possible total power constraints, which sets of target rates can be deployed in a DSL bundle. In effect, the power allocation problem has been separated into two parts. A centralized agent may decide on a target rate and a power constraint for each loop in the bundle. Then the loops themselves can undergo the iterative water-filling procedure to arrive at the desired rates without the need of centralized control. The amount of information that needs to be passed by the central control to each loop is small.

Comparing the present invention to conventional power control methods, this new method offers two key advantages. First, because the interference is controlled systematically, no power spectral density constraints are needed, thus, allowing more efficient use of total power by all users. Secondly, because a single-user water-filling is performed at each stage, optimizing each user's data rate regarding all other users as noise, the iterative water-filling algorithm offers an opportunity for different loops in a binder to negotiate the use of frequency. Thus, each loop has an incentive to move away from frequency bands when interference is strong, and concentrate on the frequency bands that it can most efficiently utilize.

Simulations show that the competitively optimal power allocation method of the present invention offers a dramatic improvement in performance. This improvement is possible because the new power control methodology considers all loops in the binder as a whole, taking into account all interactions and globally allocating power to each user. Although the competitively optimal operating points are not necessarily globally optimal, the present invention offers substantial improvement over current power back-off methods which consider only each loop by itself. These competitively optimal points are easy to find because iterative water-filling converges very fast.

It should be noted that other "transmission optimization" techniques and methods can be used instead of the disclosed water-filling method (for example, discrete loading methods). Also, the rate maximization criterion can be replaced by a margin maximization criterion, where the target data rates are fixed for each user.

Vectored Transmission

In the following example, vectored transmission for DSL systems is explained. This implementation of the present invention is useful in a packet unbundling environment where a single line is used by multiple users (for example, when leased by a single operator or where a fiber connection ends at an ONU and provides multiple parties with service from multiple service providers).

Channel Model and DMT Transmission

Figure 4:
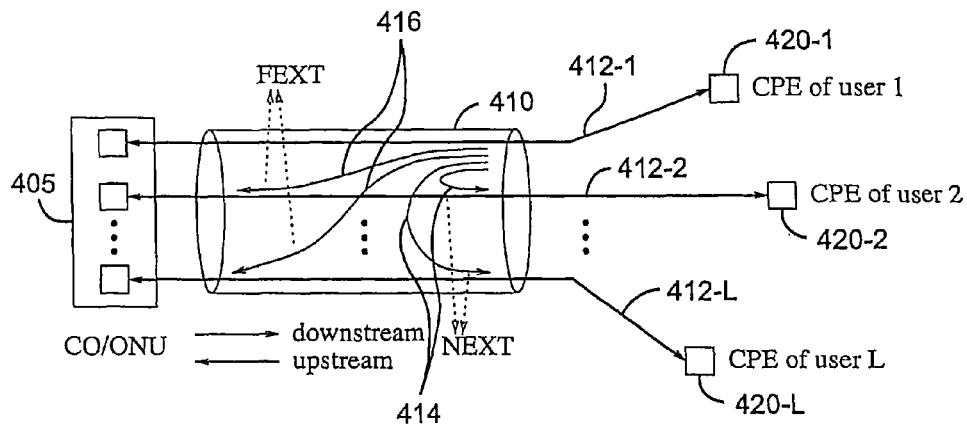
FIG. 4 is a schematic representation of a DSL system showing a bundle of transmission lines in a binder.

The DSL channel model for the architecture of FIG. 4 is now presented. The L users 420-1 through 420-L are assumed to correspond to a subset of the twisted-pairs of a group in binder 410. The sampled output for a specific user for either upstream or downstream transmission depends on the present and past input symbols of both the intended user and the other crosstalking users. A block of N output samples for user i satisfies:

$$y_i = H_{i,1}^c x_1^p + \ldots + H_{i,i}^c x_i^p + \ldots + H_{i,L}^c x_L^p + n_i \qquad \text{Eq. (19)}$$

where $H_{i,1}^c, \ldots, H_{i,L}^c$ are convolution matrices derived from the channel impulse response matrix, $y_i$ is the vector of N output samples of receiver i, $x_k^p$ is the vector of N+v input symbols of user k, and $n_i$ is the vector of N noise samples of receiver i. v represents the maximum memory of the transfer and crosstalk coupling functions expressed in number of samples. The noise samples represent the superposition of several noise sources such as crosstalk from neighboring DSL systems, radio frequency ingress and impulse noise. In the following, $n_i$ is considered to be white and gaussian and, without loss of generality, has unit variance.

Figure 9:
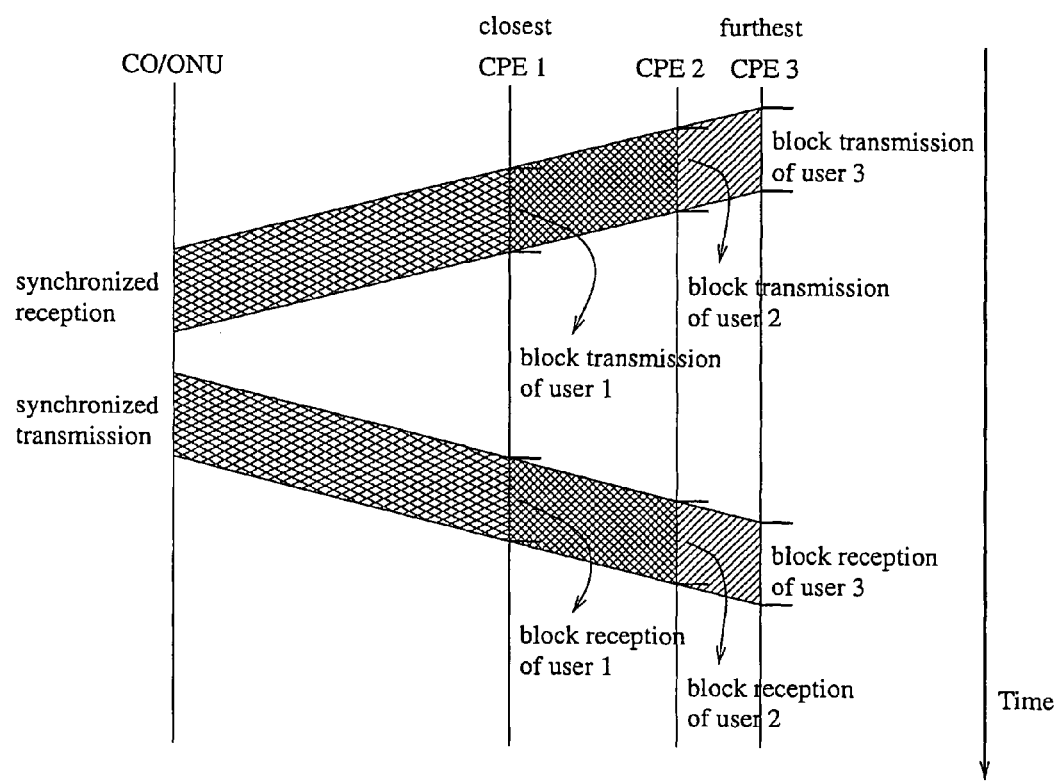
FIG. 9 is a timing diagram showing synchronization of block transmission and reception at a CO/ONU.

Two fundamental assumptions are used in connection with this discussion of a preferred embodiment. First, all users employ block transmission with a cyclic prefix (CP) of at least length v. Also, block transmission and reception at the CO/ONU are synchronized as illustrated in the timing diagram of FIG. 9.

Given the co-location assumption for the CO/ONU, synchronized block transmission is relatively straightforward to implement. However, synchronized block reception requires additional consideration, although various methods and configurations will be apparent to those of ordinary skill in the art. The block boundaries for upstream transmission are aligned so that the blocks of all users arrive simultaneously at the CO/ONU. This block-level synchronization can be performed during initialization, and is analogous to the problem of synchronized uplink transmission in a wireless environment.

Synchronization at the CO/ONU is automatically achieved when "zipper" FDD is used. According to this technique, a cyclic suffix (CS) larger than the channel propagation delay is included in addition to the CP. This "zippering" offers the benefit of eliminating residual NEXT and near-echo resulting from "spectral leakage" at frequencies close to the upstream/downstream band edges. Nevertheless, in this disclosure, the less stringent assumptions noted above will be used, understanding that residual NEXT and near-echo are mitigated by transmitter pulse-shaping and receiver windowing which are known in the art.

Taking the above into account, Equation (19) becomes:

$$y_i = H_{i,1} x_1 + \ldots + H_{i,i} x_i + \ldots + H_{i,L} x_L + n_i \qquad \text{Eq. (20)}$$

where $x_k$ is a vector of N input symbols of user k, and $H_{i,j}$, i,j=1, ..., L are circulant matrices. Combining the L users, Equation (20) becomes:

$$y = Hx + n \qquad \text{Eq. (21)}$$

where $y = [y_1^T y_2^T \ldots y_L^T]^T$, $x = [x_1^T x_2^T \ldots x_L^T]^T$, $n = [n_1^T n_2^T \ldots n_L^T]^T$, and H is a matrix whose (i,j) block is $H_{i,j}$. The noise covariance matrix is assumed to be $R_{nn} = I$.

Applying Discrete Fourier Transform (DFT) modulation, which is known in the art, an Inverse Discrete Fourier Transform (IDFT) operation is performed on each transmitted data block (prior to appending the CP), and a DFT operation is performed on each received data block (after discarding the CP), thus yielding a channel description where the samples are stacked in groups corresponding to users, and each of the groups contains samples corresponding to tones. It is desirable to reorganize these samples for further processing by stacking in groups corresponding to tones, where each group contains samples corresponding to different users. To this end, a permutation matrix P having NL rows and NL columns is defined, which is composed of the N×N blocks $P_{i,j}$ where i,j=1, ..., L. The block $P_{i,j}$ contains all zeros, except for a one at position (j,i). When matrix P is right-multiplied with a vector of size NL, the elements of P are re-ordered from L groups of N components into N groups of L components. Also, note that $P^{-1} = P^* = P$. Applying this reordering operation to both the transmitter and the receiver samples, yields:

$$Z_i = T_i U_i + N_i, \; i = 1, \ldots, N \qquad \text{Eq. (22)}$$

Therefore, $Z_i$, $U_i$ and $N_i$ contain the received samples, transmitted symbols and noise samples of all users corresponding to tone i, and $T_i$ fully characterizes MIMO transmission within tone i. In the following, a distinction between upstream and downstream will be made by adopting the notation $T_{i,up}$ and $T_{i,down}$.

Equation (22) shows that crosstalk cancellation can be performed independently in each tone. Therefore, as explained in more detail below, an array of canceller blocks can be employed at the CO/ONU to remove crosstalk within each tone for upstream communication. Similarly, precoder blocks can be used at the CO/ONU to pre-distort the transmitted signals within each tone, so that signals received at the CPE are crosstalk-free. Determining the parameters of the canceller/precoder blocks relies on perfect knowledge of the channel matrix and noise covariance matrix at the CO/ONU. This assumption is reasonable for DSL, since the twisted pair channels are stationary, and systems can afford training-based channel identification during initialization.

Figure 10:
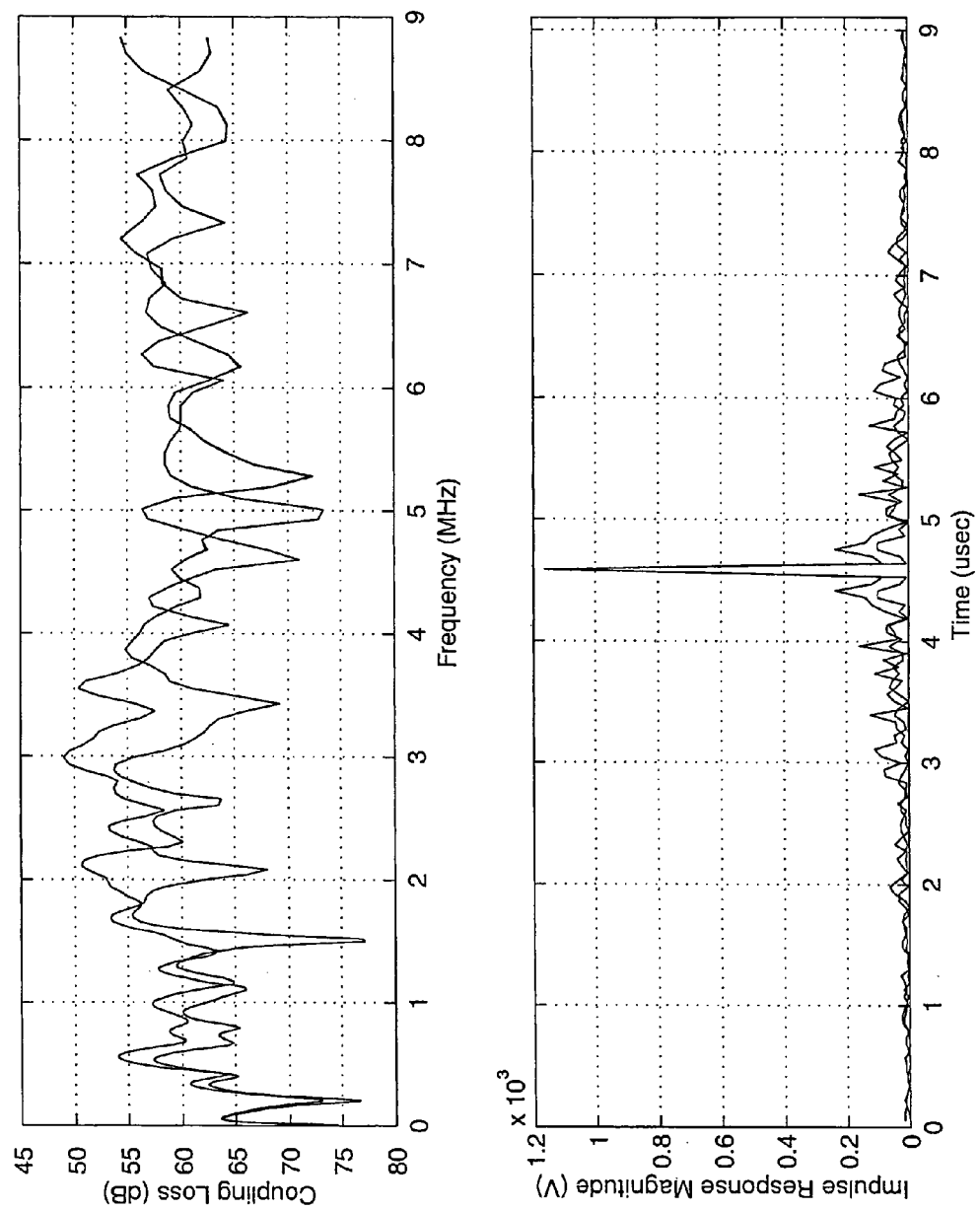
FIG. 10 shows FEXT coupling measurements for loops with length of 1640 feet.

The additional requirement of having a CP longer than the memory of both the transfer and the crosstalk coupling functions can be satisfied without suffering an excessive loss. FIG. 10 shows FEXT coupling measurements for loops with length of 1640 feet. Since only magnitude data is provided, linear phase was assumed in order to derive the impulse responses. It was found that 99.9% of the signal energy is contained within 9 sec. With a DMT block size of 4096 samples and sampling rate of 17.664 MHz, this corresponds to 159 samples. Therefore, a CP length of 320 samples (corresponding to a 7.8% loss) is more than adequate.

The average delay of a typical twisted pair is approximately 1.5 μs/kft. Given that VDSL loops usually have lengths shorter than 6000 ft, and with the previous DMT assumptions, the propagation delay corresponds to fewer than 160 samples. Therefore, even if "zippering" is used, the length of the CP plus the CS does not exceed the proposed 320 samples. As is known to those of ordinary skill in the art, in cases where the channel has unusually long memory, various techniques are available for "shortening" the memory. For example, a MIMO Time-Domain-Equalizer may be used at the CO/ONU and a MIMO extension of an appropriate precoder may be utilized for downstream communication.

Crosstalk Cancellation Via QR Decomposition

Starting with Equation (22), the methods to remove crosstalk within each tone are described first for upstream and then for downstream communication. In the following, the matrices $T_{i,up}$ and $T_{i,down}$ are assumed to be non-singular (the justification for this assumption and the consequences of ill-conditioning are discussed below).

Upstream

Figure 11:
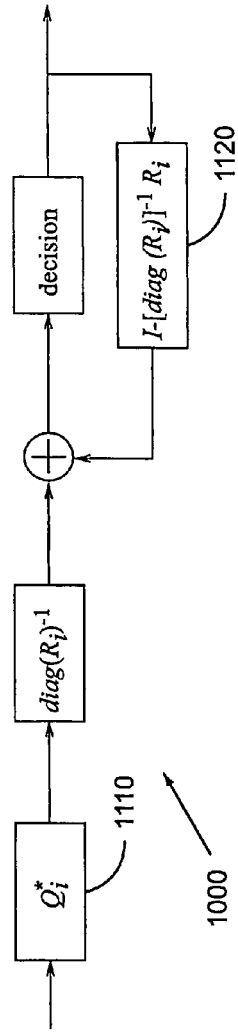
FIG. 11 shows a canceller block of one embodiment of the present invention corresponding to a single tone in a discrete multitone system.
Figure 12:
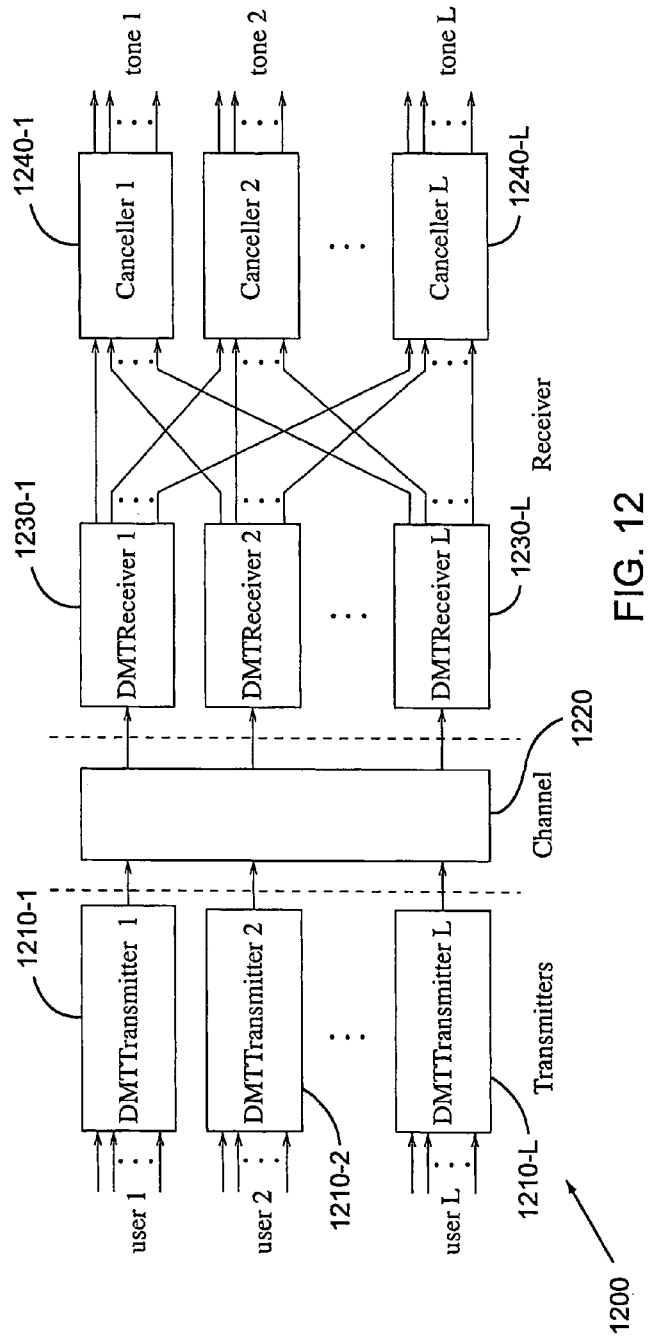
FIG. 12 shows a system for upstream vectored DMT transmission combining canceller blocks of all tones.

For upstream transmission, the co-location of the CO/ONU transceiver equipment gives the opportunity to perform joint signal processing of the received samples. The computation of the QR decomposition of matrix $T_{i,up}$ yields:

$$T_{i,up} = Q_i R_i \quad \text{Eq. (23)}$$

where $Q_i$ is a unitary matrix and $R_i$ is an upper triangular matrix. If the received samples are "rotated/reflected" by $Q_i^*$, then Equation (22) becomes:

$$\tilde{Z}_i = Q_i^* Z_i \quad \text{Eq. (24)}$$

$$= R_i U_i + \tilde{N}_i \quad \text{Eq. (25)}$$

where $\tilde{N}_i = Q_i^* N_i$ has an identity covariance matrix. Since $R_i$ is upper triangular and $\tilde{N}_i$ has uncorrelated components, the input $U_i$ can be recovered by back-substitution combined with symbol-by-symbol detection. Thus, as seen in FIG. 11, a decision feedback structure 1100 is created with the feedforward matrix module 1110 using $Q_i^*$, and the feedback matrix module 1120 using $I - R_i$. The detection of the $k^{th}$ element of $U_i$ is expressed as:

$$(\hat{U}_i)_k = dec\left[\frac{1}{r_{k,k}^i}(\tilde{Z}_i)_k - \sum_{j=k+1}^{L} \frac{r_{k,j}^i}{r_{k,k}^i}(\hat{U}_i)_j\right], \quad \text{Eq. (26)}$$

$$k = L, L-1, \ldots, 1$$

where $r_{k,j}^i$ is the (k,j) element of $R_i$. Assuming that the previous decisions are correct, crosstalk is completely cancelled, and L "parallel" channels are created within each tone. The operations described above can be used to define a preferred canceller block corresponding to a single tone, which is shown in FIG. 11. Combining the canceller blocks of all tones, and taking into account DMT transmission, a system 1200 for upstream vectored DMT transmission is shown in FIG. 12. The transmitters 1210-1 through 1210-L send their respective signals through channel 1220. The receivers 1230-1 through 1230-L receive the signals from channel 1220 and process the received signals using canceller blocks 1240-1 through 1240-L which, in the preferred embodiment, resemble the block of FIG. 11.

Downstream

For downstream transmission in the preferred embodiment, joint signal processing of the transmitted symbols is used. The QR decomposition of $T_{i,down}^T$ results in:

$$T_{i,down}^T = Q_i R_i \quad \text{Eq. (27)}$$

where again $Q_i$ is a unitary matrix and $R_i$ is an upper triangular matrix. Assuming that the symbols are "rotated/reflected" by $Q_i^{T*}$ prior to being transmitted:

$$U_i = Q_i^{T*} U_i' \quad \text{Eq. (28)}$$

So, choosing:

$$(U_i')_k = \Gamma_{M_{i,k}}\left[(\tilde{U}_i)_k - \sum_{j=1}^{k-1} \frac{r_{j,k}^i}{r_{k,k}^i}(U_i')_j\right], \quad \text{Eq. (29)}$$

$$k = 1, 2, \ldots, L$$

crosstalk-free reception is achieved, where the transmitted symbols in tone i are the elements of $\tilde{U}_i$. The following operation is performed at the receiver:

$$(\hat{Z}_i)_k = \Gamma_{M_{i,k}}\left[\frac{(Z_i)_k}{r_{k,k}^i}\right], \quad k = 1, 2, \ldots, L \quad \text{Eq. (30)}$$

where $\Gamma_{M_{i,k}}$ is defined as:

$$\Gamma_{M_{i,k}}[x] = x - M_{i,k} d \left[\frac{x + \frac{M_{i,k} d}{2}}{M_{i,k} d}\right] \quad \text{Eq. (31)}$$

and $M_{i,k}$ is the constellation size of user k on tone i, while d is the constellation point spacing.

$$\Gamma_{M_{i,k}}[x] = \Gamma_{\sqrt{M_{i,k}}}[\Re(x)] + j\Gamma_{\sqrt{M_{i,k}}}[\Im(x)].$$

Figure 13:
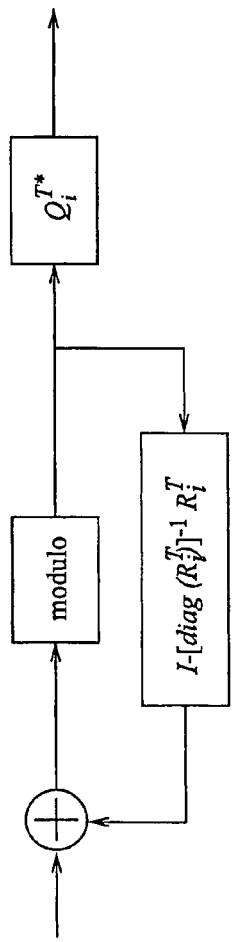
FIG. 13 shows a MIMO precoder of the present invention corresponding to a single tone in a discreet multitone system.
Figure 14:
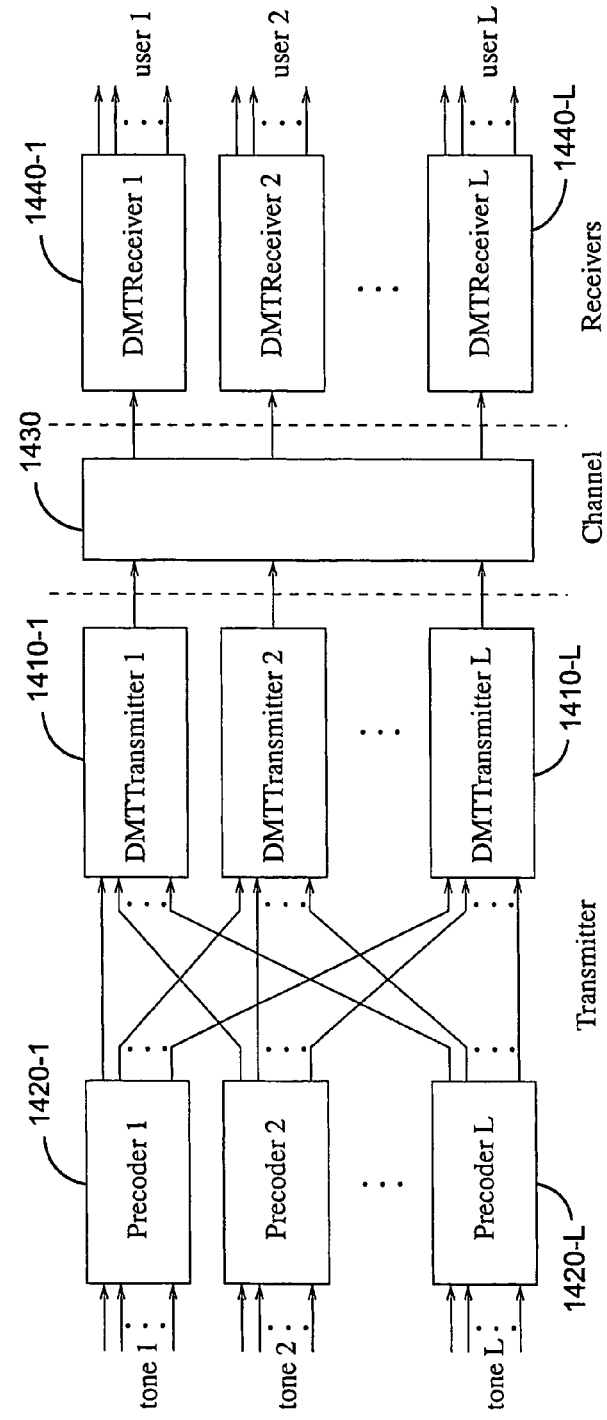
FIG. 14 shows a vectored DMT system for downstream transmission combining precoders of the present invention for all tones and including the DMT transmitter and receivers.

These operations result in:

$$\hat{Z}_i = \tilde{U}_i + [\text{diag}(R_i^T)]^{-1} N_i \qquad \text{Eq. (32)}$$

which implies crosstalk-free reception. The preferred MIMO precoder described above corresponds to a single tone and is shown in FIG. 13. Combining the precoders of all tones and including the DMT transmitters and receivers, the vectored DMT system for downstream transmission is shown in FIG. 14. This system resembles the system of FIG. 12, except that signals are "pre-processed" with precoders 1420-1 through 1420-L before being sent by the system transmitters 1410-1 through 1410-L, respectively.

Assuming that transmit and receive filtering at the CO/ONU and at the CPE is identical, and noise within a tone has the same statistics for all users, the reciprocity property for twisted pair transmission implies that $T_{i,up} = T_{i,down}^T$. In that case, Equations (23) and (27) give the QR decomposition of the same matrix.

For the upstream channel, regardless of the loop topology, the diagonal element of a column of $T_i$ is larger in magnitude than the off-diagonal elements of the same column. This occurs because, in upstream transmission, the crosstalk coupled signal originating from a specific transmitter can never exceed the "directly" received signal of the same transmitter, and typically the magnitude difference is more than 20 dB. The insertion loss of a signal is always smaller than the coupling loss that it experiences when it propagates into a neighboring pair.

Figure 15:
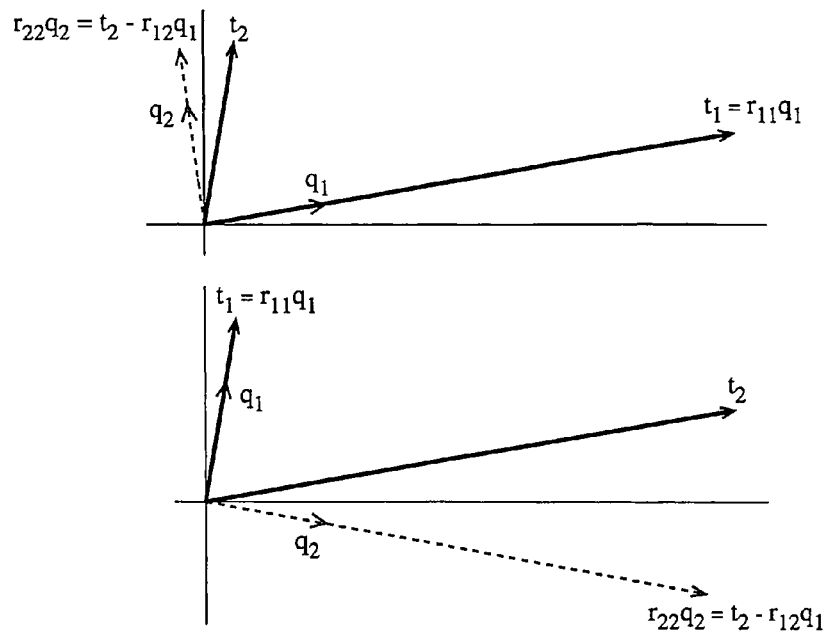
FIG. 15 illustrates the QR decomposition of two possible orderings.

Visualizing the columns of $T_i$ in vector space, it is seen that the columns are almost orthogonal to each other, which implies that $Q_i$ is close to being an identity matrix. Thus, the magnitudes of the diagonal elements of $R_i$ do not differ significantly from those of the diagonal elements of $T_i$, which indicates that QR cancellation performs almost as good as perfect crosstalk removal. This is illustrated in FIG. 15 for a two user case. As shown in FIG. 15, this holds for both possible detection orderings.

The preceding discussion concerning upstream transmission can be readily extended to downstream transmission by starting with the observation that the crosstalk signals at a specific receiver can never exceed the magnitude of a "directly" received signal. Alternatively, the same conclusions can be reached by using the transpose relationship between the upstream and downstream channel matrices.

The computational cost incurred by the QR cancellation is decomposed into the cost of the QR decompositions and the cost associated with signal processing. DSL channels are stationary, so the QR decompositions need to be computed infrequently (preferably during initialization). Generally, the number of flops per tone (for example, using the Householder transform) can be greatly reduced by taking advantage of the crosstalk environment characteristics. It is known that the crosstalk noise in a pair originates mostly from just three or four neighboring pairs, which implies that a typical $T_i$ matrix is almost sparse with only three or four relatively large off-diagonal elements per row. Therefore, approximating $T_i$ as a sparse matrix, Givens rotations can be employed to triangularize $T_i$ with a reduced number of flops. On the other hand, the real-time computational burden due to the canceller and precoder blocks cannot be reduced. In a straightforward implementation, the operations dominating the total cost are those of Equations (24) and (28).

Although the assumption of perfect channel matrix knowledge is reasonable in the given environment, it is still worth briefly considering the effects of channel estimation errors. The upstream channel matrix for a given tone can be estimated, including a channel estimation error. Then, the QR decomposition with the reciprocity assumption can be performed to get the QR factor estimates. Starting from Equation (24), the effect on upstream communication can be computed. Doing this, it is found that the estimation errors impact transmission by introducing a "bias" in the detection and also by permitting some residual crosstalk. A similar analysis can be applied for downstream communication, but modulo arithmetic complicates the expressions. Ignoring the modulo operations, the effects of the estimation errors can be separated into a detection bias term and a residual crosstalk term.

The results of this analysis reveal that the impact of channel estimation errors is aggravated when any of the diagonal elements of $\hat{R}_i$ are small. Although channel matrix singularity is almost impossible in the DSL environment, an ill-conditioned channel (implying small diagonal elements) cannot be ruled out, thus increasing the impact of channel estimation errors and posing several computational problems. Such cases arise in high frequencies (for example, in loop topologies that have extreme loop length differences) or in the presence of bridged taps. Nevertheless, the energy allocation algorithms discussed below prevent the occurrence of such phenomena by not allowing transmission in frequencies where the diagonal elements of $R_i$ are small.

As seen above, the elimination of crosstalk in the signals of a system will substantially improve performance of the system. Optimizing energy allocations in the system, when taken in conjunction with the crosstalk elimination likewise improves system performance. Also, as noted above, appropriate energy allocation can help avoid problems resulting from the impact of estimation errors in ill-conditioned channels.

Transmission Optimization

"Transmission optimization" as used in the following example will refer to maximization of a weighted data rate sum. However, in the broadest sense of the present invention, the term "optimization" is not so limited. Optimization may also mean determining the maximum rates available and allocating or provisioning available resources (including data rates for various users) within a digital communication system.

The methods disclosed in the following discussion concern energy allocation in frequency generally, energy allocation in frequency while observing constraints on induced crosstalk, and energy allocation combined with upstream/downstream frequency selection.

Energy Allocation in General

The optimization objective is the maximization of the weighted sum of the data rates of all users:

$$\max \sum_{k=1}^{L} a_k R_k \qquad \text{Eq. (33)}$$

where $\alpha_k \geq 0$ is the weight assigned to the $k^{th}$ user, and $R_k$ is the achievable data rate of the $k^{th}$ user, which may refer to either the upstream or the downstream direction. In order to compute the data rate, an appropriate known gap approximation is employed. Taking into account the fact that vectoring essentially "diagonalizes" the channel (and assuming no error propagation in the upstream direction), the upstream and downstream achievable rates are obtained:

$$R_{k,up} = \sum_{i \in N_{up}} \frac{1}{2}\log_2\left(1 + \frac{|r_{k,k}^i|^2 \varepsilon_{k,up}^i}{\Gamma}\right) \quad \text{Eq. (34)}$$

$$R_{k,down} = \sum_{i \in N_{down}} \frac{1}{2}\log_2\left(1 + \frac{|r_{k,k}^i|^2 \varepsilon_{k,down}^i}{\Gamma}\right) \quad \text{Eq. (35)}$$

where $\Gamma$ is defined as the transmission gap, and depends on the probability of error requirement, the coding gain and the required margin. Also, $N_{up}$ and $N_{down}$ are the sets of upstream and downstream tone indices correspondingly, which depend on the FDD plan. Error propagation effects are generally limited since DSL systems operate at very small probabilities of error.

The parameters with respect to which optimization takes place are $\epsilon_{k,up}^i$ for upstream transmission and $\epsilon_{k,down}^i$ for downstream transmission. These parameters are constrained by limits on the transmitted energy. In upstream transmission, the total transmit energy is constrained by:

$$\sum_{i \in N_{up}} \tilde{\varepsilon}_k^i \leq \mathcal{E}_{k,up} \quad \text{Eq. (36)}$$

where $\tilde{\epsilon}_k^i$ is the energy of $(U_i)_k$ in Equation (25), and $\mathcal{E}_{k,up}$ is the maximum allowed upstream transmitted energy of user k. Since $\epsilon_{k,up}^i = \tilde{\epsilon}_k^i$, it is deduced that:

$$\sum_{i \in N_{up}} \varepsilon_{k,up}^i \leq \mathcal{E}_{k,up} \quad \text{Eq. (37)}$$

In downstream transmission, the total transmit energy constraint is expressed as:

$$\sum_{i \in N_{down}} \tilde{\varepsilon}_k^i \leq \mathcal{E}_{k,down} \quad \text{Eq. (38)}$$

where $\tilde{\epsilon}_k^i$ is the energy of $(U_i)_k$ in Equation (21), and $\mathcal{E}_{k,down}$ is the maximum allowed downstream transmitted energy of user k. Unfortunately, this constraint does not translate directly to a constraint for $\tilde{\epsilon}_k^i = \epsilon_{k,down}^i$, due to non-linear precoding.

However, simulation results for extreme loop topologies indicate that use of the preferred precoder described above does not result in considerable correlation between the transmitted signals of different users. It is reasonable to assume that this result holds generally, since the simulated loops correspond to a worst-case situation with regard to the crosstalk coupling.

Therefore, the approximation $\epsilon_k^i \approx \tilde{\epsilon}_{k,down}^i$ is made and Equation (38) for downstream becomes:

$$\sum_{i \in N_{down}} \varepsilon_{k,down}^i \leq \mathcal{E}_{k,down} \quad \text{Eq. (39)}$$

With this in mind, it is seen that the energy allocation problem of Equation (33) becomes independent for each user, and thus the $\alpha_k$ weights are irrelevant in this scenario. The optimization problem for each transmission direction is broken into k waterfilling problems expressed by:

$$\max \quad \sum_{i \in N_{up}} \frac{1}{2}\log_2\left(1 + \frac{|r_{k,k}^i|^2 \varepsilon_{k,up}^i}{\Gamma}\right) \quad \text{Eq. (40)}$$

$$\text{subject to} \quad \sum_{i \in N_{up}} \varepsilon_{k,up}^i \leq \mathcal{E}_{k,up} \quad \text{Eq. (41)}$$

and by:

$$\max \quad \sum_{i \in N_{down}} \frac{1}{2}\log_2\left(1 + \frac{|r_{k,k}^i|^2 \varepsilon_{k,down}^i}{\Gamma}\right) \quad \text{Eq. (42)}$$

$$\text{subject to} \quad \sum_{i \in N_{down}} \varepsilon_{k,down}^i \leq \mathcal{E}_{k,down} \quad \text{Eq. (43)}$$

Solutions to these problems can be derived using known techniques. The resulting transmission spectra are optimal in the context of vectored DMT.

Energy Allocation with Power Back-Off

As discussed above, all users in the preferred vectored transmission correspond to a group of neighboring twisted pairs. This does not preclude the operation of other "alien" DSL systems in neighboring twisted pairs, which on one hand cause crosstalk into the vectored systems, and on the other hand suffer from crosstalk originating from the vectored systems. The current approach in dealing with this problem is to impose limits on the transmitted power spectral densities (PSDs), so that the performance of systems is not excessively affected by crosstalk.

Figure 5:
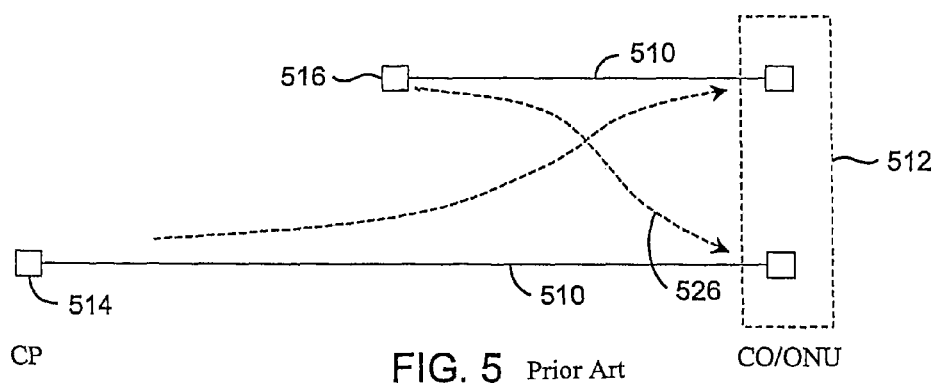
FIG. 5 is a schematic representation of the near-far problem encountered with FEXT crosstalk.
Figure 6:
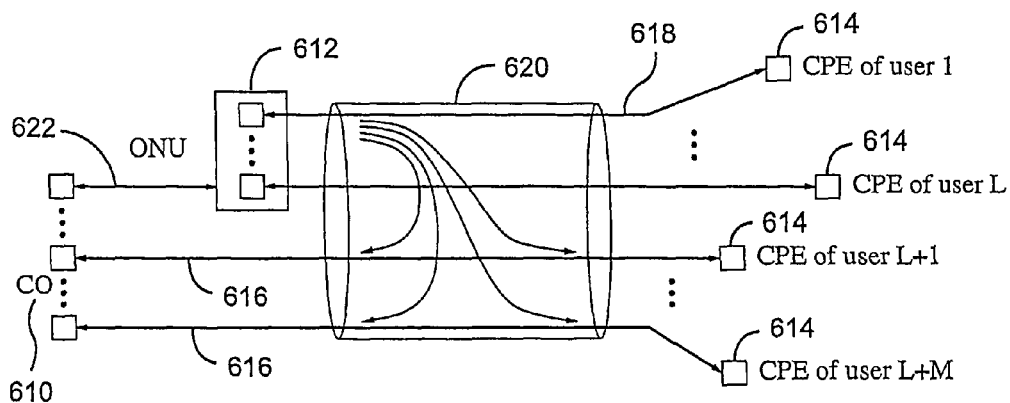
FIG. 6 is a schematic representation of a DSL system showing a bundle of transmission lines in a binder wherein some of the lines share a fiber or other link between a CO and an ONU.
Figure 16:
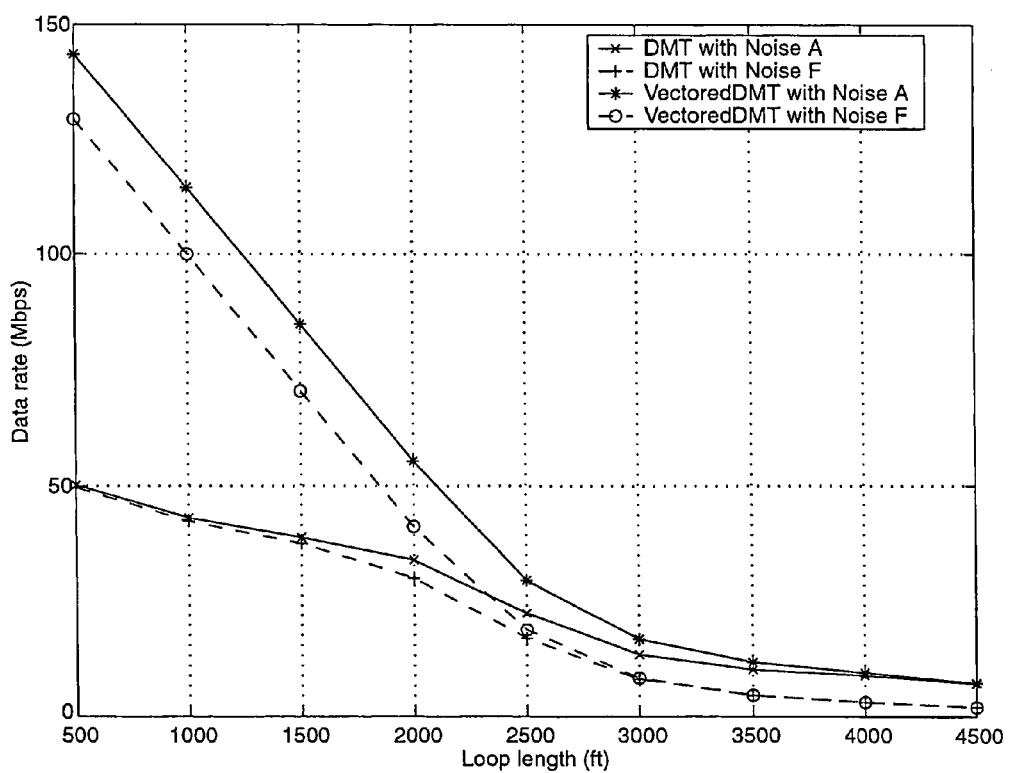
FIG. 16 is a graphical depiction of differences in data rates in available with one embodiment of the present invention as a function of loop lengths.

Additionally, as in the situation illustrated in FIG. 5, VDSL systems suffer from the fact that upstream signals on short lines detrimentally affect upstream performance on long lines (similarly to the near-far situation in wireless communications). In order to avoid imposing an overly restrictive universal PSD mask, power back-off methods have been proposed which effectively make the PSD mask dependent solely on the loop length of the specific user. A similar scenario, where the downstream communication of neighboring DSL systems may suffer considerably is shown in FIG. 16. Dramatic loop length differences will occur more frequently as ONUs are installed on some lines while twisted pair connections to the COs remain.

Vectoring combined with full channel matrix knowledge can prove effective in limiting the crosstalk induced by vectored systems, without resorting to the introduction of a universal PSD mask, or the use of power back-off methods (which do not necessarily take into account knowledge about crosstalk coupling resulting from matrix channel identification).

Equation (22) can be augmented to include the received samples of alien systems:

$$\begin{bmatrix} Z \\ Z_n \end{bmatrix} = \begin{bmatrix} T & C_n \\ C & T_n \end{bmatrix}\begin{bmatrix} U \\ U_n \end{bmatrix} + \begin{bmatrix} N \\ N_n \end{bmatrix} \quad \text{Eq. (44)}$$

where $Z_n$, $U_n$, and $N_n$ are vectors of the received samples, of the transmitted symbols and of the noise samples, respectively, of the alien systems. The definitions of the block matrices C, $C_n$ and $T_n$ depend on both the channel and the characteristics of the alien DSL systems; and, although T is block diagonal, this property will not generally hold for the other matrices.

When Z and $Z_n$ correspond to systems belonging to different service providers, it may be difficult to identify the crosstalk coupling matrices C and $C_n$, due to the fact that the current unbundling framework does not allow the first provider to obtain access to either Z or $Z_n$, and similarly for the second provider. However, a "third party" of the type disclosed in U.S. Ser. No. 09/788,267, overcomes this difficulty by introducing an impartial third-party site or operation, which captures all transmitted and received data to produce estimates of the crosstalk coupling matrices.

Limiting the FEXT in the mean square sense, results in the following conditions:

$$\sum_{k=1}^{L}\sum_{i\in N_{up}}|c_{j,(k-1)N+i}|^2 \varepsilon_{k,up}^i \leq \varepsilon_{j,up}^c, \quad j=1,\ldots,MN_N \qquad \text{Eq. (45)}$$

$$\sum_{k=1}^{L}\sum_{i\in N_{down}}|c_{j,(k-1)N+i}|^2 \varepsilon_{k,down}^i \leq \varepsilon_{j,down}^c, \quad j=1,\ldots,MN_N \qquad \text{Eq. (46)}$$

where M is the number of neighboring systems, $N_N$ is the number of "dimensions" (for example, the number of tones) per neighboring system, $\varepsilon_{j,up}^c$, $\varepsilon_{j,down}^c$ are the maximum allowable crosstalk energies in sample j of the neighboring systems for upstream and downstream, and $c_{j,l}$ is the (j,l) element of the MN×LN matrix C. Note that this approach can be generalized, so that both FEXT and NEXT are restricted.

The set of inequalities in Equations (45) and (46), combined correspondingly with those of Equations (37) and (39), form a set of linear inequality constraints. Including the rate maximization objective of Equation (33) yields the following optimization problems:

$$\max \sum_{k=1}^{L} a_k \sum_{i\in N_{up}} \frac{1}{2}\log_2\left(1+\frac{|r_{k,k}^i|^2 \varepsilon_{k,up}^i}{\Gamma}\right) \qquad \text{Eq. (47)}$$

subject to $\sum_{i\in N_{up}} \varepsilon_{k,up}^i \leq \varepsilon_{k,up}, \quad k=1,\ldots,L \qquad \text{Eq. (48)}$ $$\sum_{k=1}^{L}\sum_{i\in N_{up}}|c_{j,(k-1)N+i}|^2 \varepsilon_{k,up}^i \leq \varepsilon_{j,up}^c, \qquad \text{Eq. (49)}$$

$j=1,\ldots,MN_N$ and by:

$$\max \sum_{k=1}^{L} a_k \sum_{i\in N_{down}} \frac{1}{2}\log_2\left(1+\frac{|r_{k,k}^i|^2 \varepsilon_{k,down}^i}{\Gamma}\right) \qquad \text{Eq. (50)}$$

subject to $\sum_{i\in N_{down}} \varepsilon_{k,down}^i \leq \varepsilon_{k,down}, \quad k=1,\ldots,L \qquad \text{Eq. (51)}$ $$\sum_{k=1}^{L}\sum_{i\in N_{down}}|c_{j,(k-1)N+i}|^2 \varepsilon_{k,down}^i \leq \varepsilon_{j,down}^c, \qquad \text{Eq. (52)}$$

$j=1,\ldots,MN_N$

The objective functions are concave (since they are sums of log functions), and the constraints form convex sets (because they are linear inequalities). Thus, solutions can be efficiently produced using known convex programming techniques. Other restrictions (such as PSD masks or bit caps) can be included in the above optimization problems, since they only require the introduction of linear inequality constraints, which preserve the convexity of the problem.

Energy Allocation and Upstream/Downstream Frequency Selection

Although all existing DSL systems employing FDD have a fixed upstream/downstream frequency duplexing band plan, a dynamically configured band plan may offer significant advantages. Such a plan is common for all users, but is determined during modem initialization, depending on the specific transmission environment, as well as user requirements.

Examples of the disadvantages of a fixed band plan arise in the presence of bridged taps, where transmission in one direction may face a disproportionate degradation, while transmission in the opposite direction may remain unscathed. Adopting a dynamic band methodology in such a case can provide a fairer distribution of the impact on both upstream and downstream activity.

The optimization objective can now be expressed by:

$$\max \sum_{k=1}^{L}(a_{k,up}R_{k,up} + a_{k,down}R_{k,down}) \qquad \text{Eq. (53)}$$

where $a_{k,up}, a_{k,down} \geq 0$ are the weights assigned to upstream and downstream transmission for user k, and $R_{k,up}, R_{k,down}$ are the achievable upstream and downstream rates of user k. Here, the optimization parameters involve not just the energies assigned but also the selection of upstream/downstream tones. However, if Equations (34) and (35) are used, the partition of the set of tones into $N_{up}$ and $N_{down}$ is a binary constrained problem, whose solution has very high complexity.

Instead, the binary constraints can be relaxed, which greatly simplifies the computations. This idea has previously been used for the computation of the FDMA capacity of the Gaussian multiple access channel in the presence of intersymbol interference. In more detail, it initially is assumed that each tone is time-shared between upstream and downstream, thus obtaining the following achievable rates:

$$R_{k,up} = \sum_{i=1}^{N} t_{i,up}\frac{1}{2}\log_2\left(1+\frac{|r_{k,k}^i|^2 \varepsilon_{k,up}^i}{t_{i,up}\Gamma}\right) \qquad \text{Eq. (54)}$$

$$R_{k,down} = \sum_{i=1}^{N} t_{i,up}\frac{1}{2}\log_2\left(1+\frac{|r_{k,k}^i|^2 \varepsilon_{k,down}^i}{t_{i,down}\Gamma}\right) \qquad \text{Eq. (55)}$$

where $t_{i,up}, t_{i,down}$ describe the fraction of time in tone i used for upstream and downstream transmission correspondingly, and $t_{i,up}+t_{i,down}=1$; $t_{i,up}, t_{i,down} \geq 0$. The existence of $t_{i,up}$ and $t_{i,down}$ in the denominators inside the log expressions implies that the assigned energy is "boosted" since transmission takes place over only some fraction of time. The energy constraints for user k are:

$$\sum_{i=1}^{N} \varepsilon_{k,up}^{j} \leq \varepsilon_{k,up} \qquad \text{Eq. (56)}$$

$$\sum_{i=1}^{N} \varepsilon_{k,down}^{j} \leq \varepsilon_{k,down} \qquad \text{Eq. (57)}$$

Therefore, the optimization problem has the following form:

$$\max \sum_{k=1}^{L} \left[ a_{k,up} \sum_{i=1}^{N} t_{i,up} \frac{1}{2} \log_2 \left( 1 + \frac{|r_{k,k}^j|^2 \varepsilon_{k,up}^j}{t_{i,up} \Gamma} \right) + \\ a_{k,down} \sum_{i=1}^{N} t_{i,down} \frac{1}{2} \log_2 \left( 1 + \frac{|r_{k,k}^j|^2 \varepsilon_{k,down}^j}{t_{i,down} \Gamma} \right) \right] \qquad \text{Eq. (58)}$$

$$\text{subject to } \sum_{i=1}^{N} \varepsilon_{k,up}^{j} \leq \varepsilon_{k,up}, \; k=1,\ldots,L \qquad \text{Eq. (59)}$$

$$\sum_{i=1}^{N} \varepsilon_{k,down}^{j} \leq \varepsilon_{k,down}, \; k=1,\ldots,L \qquad \text{Eq. (60)}$$

$$t_{i,up} + t_{i,down} = 1, \; i=1,\ldots,N \qquad \text{Eq. (61)}$$

The objective function is concave, because it is a sum of functions of the form $$x \log \left( 1 + \frac{y}{x} \right),$$

which are known to be concave in $x,y \geq 0$. The constraint sets are clearly convex, since they are defined by linear inequalities. Therefore, the problem is convex and a variety of methods can be used to efficiently derive a solution.

Still, such a solution would actually yield a hybrid between an FDD and a Time Division Duplexing (TDD) implementation. Since an FDD implementation is required, an approximate solution is obtained by rounding $t_{i,up}$ and $t_{i,down}$. Naturally, this is suboptimal, but when the number of tones is fairly large, it will be adequately close to the optimal solution. Simulation results validate this claim. Note that the power back-off constraints of the previous subsection also can be included in the problem formulation without considerably affecting the difficulty of obtaining a solution.

In the above discussion, the objective has been the maximization of a weighted data rate sum. It will be apparent to one of ordinary skill, however, that by adjusting the weights, different surface points of the data rate region achievable by vectored transmission can be determined, and thus the whole multi-dimensional surface can be determined as well. However, visualizing the inherent tradeoffs becomes difficult when the weighted sums include more than three terms. One practical question that can be posed to a service provider is whether a given vectored system can support a set of rate requirements and, if so, what energy allocation is required for achieving the requirements. This problem actually has a duality relationship with the weighted data rate sum problem, and thus the weighted sum problem provides an alternative method to solve the "feasibility" problem.

Vectoring without power back-off or frequency planning can improve performance significantly in several respects. For a given loop length, VDMT allows the achievement of much higher data rates. These rate increases are considerable for lengths in the range of 3500-4500 feet or less. The gains can be even greater in short loops, where transmission is obviously FEXT-limited. Also, vectored DMT can extend the maximum loop length given a data rate requirement. For example, a downstream rate requirement of 50 Mbps typically limits a standard DMT system to loop lengths shorter than 1150 feet. Use of the present invention can extend the reach to lengths on the order of 2650 feet and possibly longer.

Figure 17:
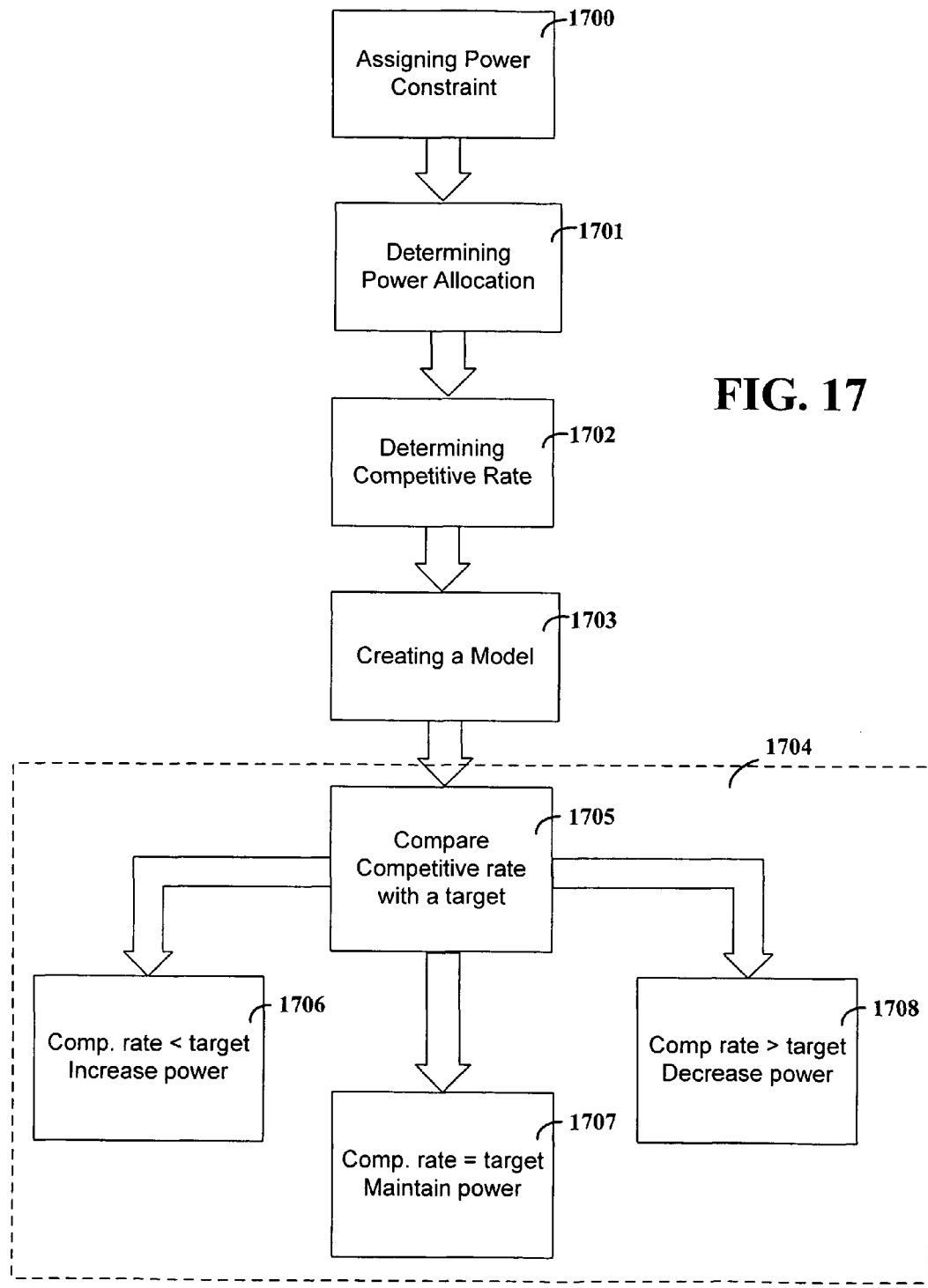
FIG. 17 is a flow diagram representation of one embodiment of the present invention in which power levels are determined.

The following table shows an example flowchart commensurate with the foregoing discussion. As illustrated in FIG. 17, one approach for controlling a digital communication system having a plurality of data-carrying communication lines having the available total power for use in the system limited by a power constraint is implemented as follows:

As depicted by block 1700, the total power constraint for each line is assigned an initial value. As depicted by block 1702, a competitively optimal data rate is determined for each line. According to one example embodiment, the competitively optimal data rate is determined by performing the steps of: determining a power allocation within the total power constraint of each line by iteratively allowing each line to optimize its power allocation as detected in block 1701, and determining the competitively optimal data rate for each line based on the determined power allocation for the line in block 1702. As depicted by block 1703, a model of the line, signal and the actual interference characteristics of the communication lines is created. As depicted by block 1704, signals are processed using the model to remove interference from signals including evaluating the competitively optimal data rate for each line. According to one example embodiment, the signals are processed by performing the steps of: comparing the competitively optimal data rate of a line with a target rate for the line as depicted in block 1705; increasing the power constraint for a line if the competitively optimal data rate of the line is less than the target rate for the line as depicted in block 1706; decreasing the power constraint for the line if the competitively optimal data rate of the line exceeds the target rate for the line by at least a prescribed variance as depicted in block 1708; maintaining the power constraint for the line if the competitively optimal data rate of the line is equal to the target rate for the line; and maintaining the power constraint for the line if the competitively optimal data rate of the line exceeds the target rate for the line by less than the prescribed variance as depicted in block 1707.

When energy allocation is further constrained by the requirement that some "alien" DSL system also must be protected against crosstalk from the vectored system, then a service provider can perform power back-off in a "selective" way, so that the performance impact can be distributed according to the service priorities. Further improvements are seen when the upstream/downstream duplexing frequency plan is allowed to vary in each vectored bundle depending on the loop characteristics and the service requirements.

Generally, embodiments of the present invention employ various processes involving data transferred through one or more computer systems and/or modems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the present description.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Hence, all suitable modifications and equivalents are deemed to fall within the scope of the invention.

What is claimed is:

1. An arrangement for controlling communication in a digital communication system having a plurality of communication lines on which signals are transmitted and received, the signals being affected by interference during transmission, the arrangement comprising:

a first processing arrangement that creates a model of the interference characteristics of a communication line selected from the plurality of communication lines, the interference characteristics due to signals carried on the plurality of communication lines;

a second processing arrangement that processes signals using the model to determine interference characteristics created by actual signals carried on the other communication lines and in response, remove interference from the actual signals; and a plurality of user blocks, wherein at least one block operates independent from other blocks and adapted to collect information about line, signal and interference characteristics of the communication lines at a common processing node responsive to the actual signals, wherein each user block is permitted to transmit and receive signals using a data rate and wherein the second processing arrangement is further adapted to analyze a weighted sum of the data rates of the signals over the plurality of communication lines.

2. The arrangement of claim 1, wherein the second processing arrangement further allocates energy to each of the plurality of communication lines for transmission of signals.

3. The arrangement of claim 2 wherein the signals are sent using a plurality of frequencies and further wherein the second processing arrangement is further adapted to dynamically adjust the frequencies used to send the signals.

* * * * *